US011340960B2

(12) United States Patent
Santoni et al.

(10) Patent No.: US 11,340,960 B2
(45) Date of Patent: May 24, 2022

(54) APPARATUSES, METHODS, AND SYSTEMS FOR HARDWARE-ASSISTED LOCKSTEP OF PROCESSOR CORES

(71) Applicants: Umberto Santoni, Scottsdale, AZ (US); Philip Abraham, Burlingame, CA (US)

(72) Inventors: Umberto Santoni, Scottsdale, AZ (US); Philip Abraham, Burlingame, CA (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 16/833,454

(22) Filed: Mar. 27, 2020

(65) Prior Publication Data

US 2021/0303372 A1  Sep. 30, 2021

(51) Int. Cl.
*G06F 9/30*  (2018.01)
*G06F 9/52*  (2006.01)
*G06F 9/38*  (2018.01)
*G06F 11/16*  (2006.01)

(52) U.S. Cl.
CPC ............ *G06F 9/52* (2013.01); *G06F 9/3005* (2013.01); *G06F 9/30101* (2013.01); *G06F 9/30196* (2013.01); *G06F 9/3842* (2013.01); *G06F 11/16* (2013.01); *G06F 11/1629* (2013.01)

(58) Field of Classification Search
CPC ............................. G06F 11/16; G06F 11/1629
See application file for complete search history.

(56) References Cited

U.S. PATENT DOCUMENTS

| 2005/0050304 A1* | 3/2005 | Mukherjee ............ G06F 11/366 712/218 |
| 2017/0322878 A1* | 11/2017 | Wang .................. G06F 11/1004 |
| 2019/0158126 A1* | 5/2019 | Carlough ............... H04L 1/243 |
| 2021/0141685 A1* | 5/2021 | Li ......................... G06F 11/106 |

OTHER PUBLICATIONS

Blem et al.; Instruction Set Extensions for Cyclic Redundancy Check on a Multithreaded Processor; 2005 (Year: 2005).*

* cited by examiner

*Primary Examiner* — Corey S Faherty
(74) *Attorney, Agent, or Firm* — Nicholson De Vos Webster & Elliott LLP

(57) ABSTRACT

Systems, methods, and apparatuses relating to circuitry to implement lockstep of processor cores are described. In one embodiment, a hardware processor comprises a first processor core comprising a first control flow signature register and a first execution circuit, a second processor core comprising a second control flow signature register and a second execution circuit, and at least one signature circuit to perform a first state history compression operation on a first instruction that executes on the first execution circuit of the first processor core to produce a first result, store the first result in the first control flow signature register, perform a second state history compression operation on a second instruction that executes on the second execution circuit of the second processor core to produce a second result, and store the second result in the second control flow signature register.

24 Claims, 20 Drawing Sheets

| CONTROL_FLOW_SIGNATURE (CFSR) 300 | | |
|---|---|---|
| Default | Attribute | Description |
| 0h | RO | CONTROL_FLOW_SIGNATURE – SIGNATURE (E.G., CRC) VALUE OF ALL THE INSTRUCTIONS RETIRED SINCE CFSR WAS INITIALIZED.<br>ONE CFSR FOR EACH CORE (E.G., CPU). |

FIG. 3

| DATA_FLOW_SIGNATURE (DFSR) 400 | | |
|---|---|---|
| Default | Attribute | Description |
| 0h | RO | DATA_FLOW_SIGNATURE – SIGNATURE (E.G., CRC) VALUE OF EXECUTION RESULTS GENERATED BY ALL INSTRUCTIONS RETIRED SINCE DFSR WAS INITIALIZED.<br>ONE DFSR FOR EACH CORE (E.G., CPU). |

FIG. 4

| SIGNATURE_MASK_REGISTER (SMR) 500 | | |
|---|---|---|
| Default | Attribute | Description |
| 0h | RW | MASK – INDICATES CORE(S) (E.G., CPU(S)) TO WHICH THE SIGNATURE_CONTROL_REGISTER COMMAND IS APPLIED. ONE SMR FOR ALL CORES (E.G., CPUs).<br>A BIT SET INDICATES THAT THE COMMAND WRITTEN TO SIGNATURE_CONTROL_REGISTER WILL APPLY TO THAT CORE (E.G., CPU).<br>A BIT CLEAR INDICATES THAT THE COMMAND WRITTEN TO SIGNATURE_CONTROL_REGISTER WILL NOT APPLY TO THAT CORE (E.G., CPU). |

FIG. 5

| SIGNATURE_CONTROL_REGISTER (SCR) 600 | | |
|---|---|---|
| Default | Attribute | Description |
| 0h | RW | CONTROL – INDICATES COMMAND TO BE APPLIED TO CORE (E.G., CPU) CFSR, DFSR. ONE SCR FOR ALL CORES (E.G., CPUs).<br>00B INITIALIZE CFSR AND DFSR<br>01B BEGIN UPDATES TO CFSR AND DFSR<br>10B STOP UPDATES TO CFSR AND DFSR |

FIG. 6

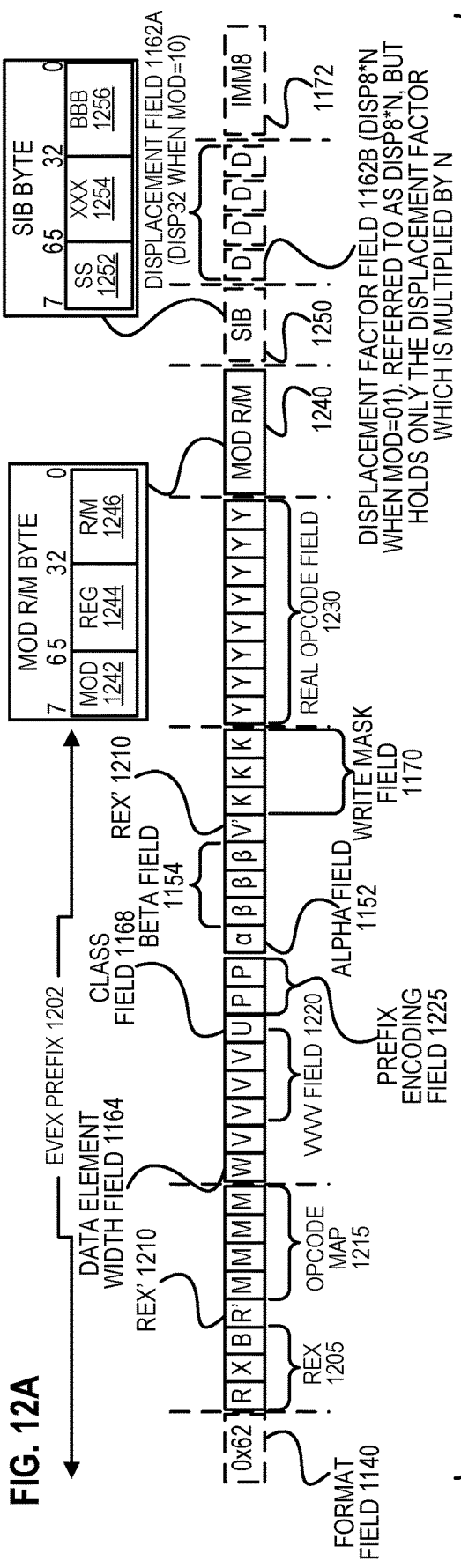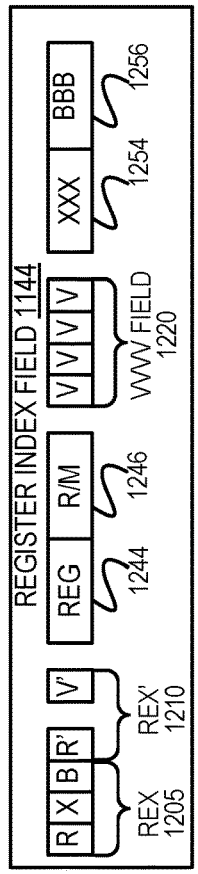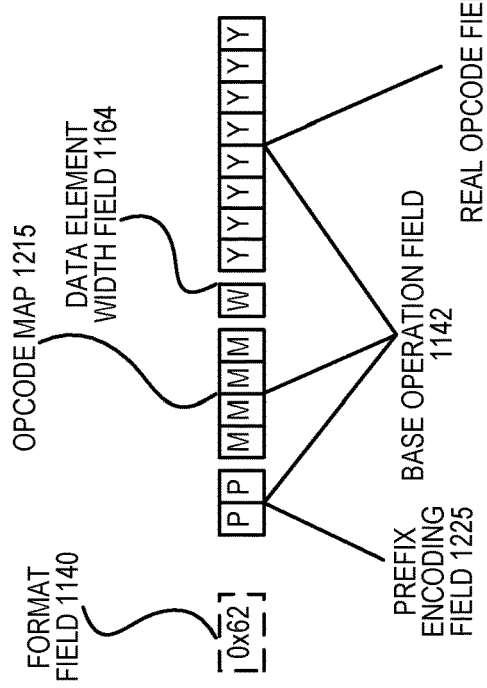

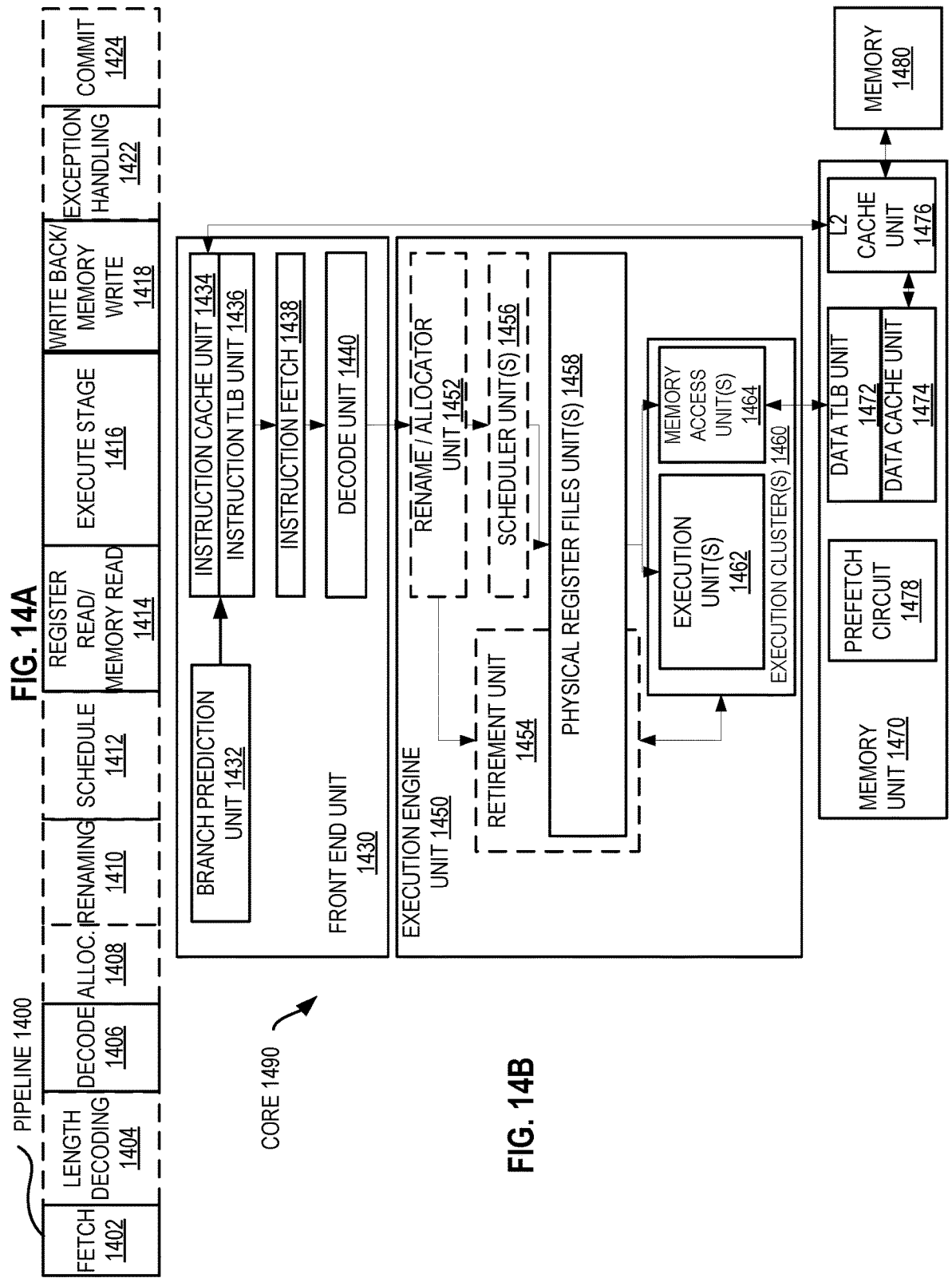

US 11,340,960 B2

APPARATUSES, METHODS, AND SYSTEMS FOR HARDWARE-ASSISTED LOCKSTEP OF PROCESSOR CORES

TECHNICAL FIELD

The disclosure relates generally to electronics, and, more specifically, an embodiment of the disclosure relates to circuitry to implement lockstep of processor cores.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates an example format for a control flow signature register (CFSR) according to embodiments of the disclosure.

FIG. 4 illustrates an example format for a data flow signature register (DFSR) according to embodiments of the disclosure.

FIG. 5 illustrates an example format for a signature mask signature register (SMR) according to embodiments of the disclosure.

FIG. 6 illustrates an example format for a signature control register (SCR) according to embodiments of the disclosure.

FIG. 12A is a block diagram illustrating fields for the generic vector friendly instruction formats in FIGS. 11A and 11B according to embodiments of the disclosure.

FIG. 12B is a block diagram illustrating the fields of the specific vector friendly instruction format in FIG. 12A that make up a full opcode field according to one embodiment of the disclosure.

FIG. 12C is a block diagram illustrating the fields of the specific vector friendly instruction format in FIG. 12A that make up a register index field according to one embodiment of the disclosure.

FIG. 14A is a block diagram illustrating both an exemplary in-order pipeline and an exemplary register renaming, out-of-order issue/execution pipeline according to embodiments of the disclosure.

FIG. 14B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
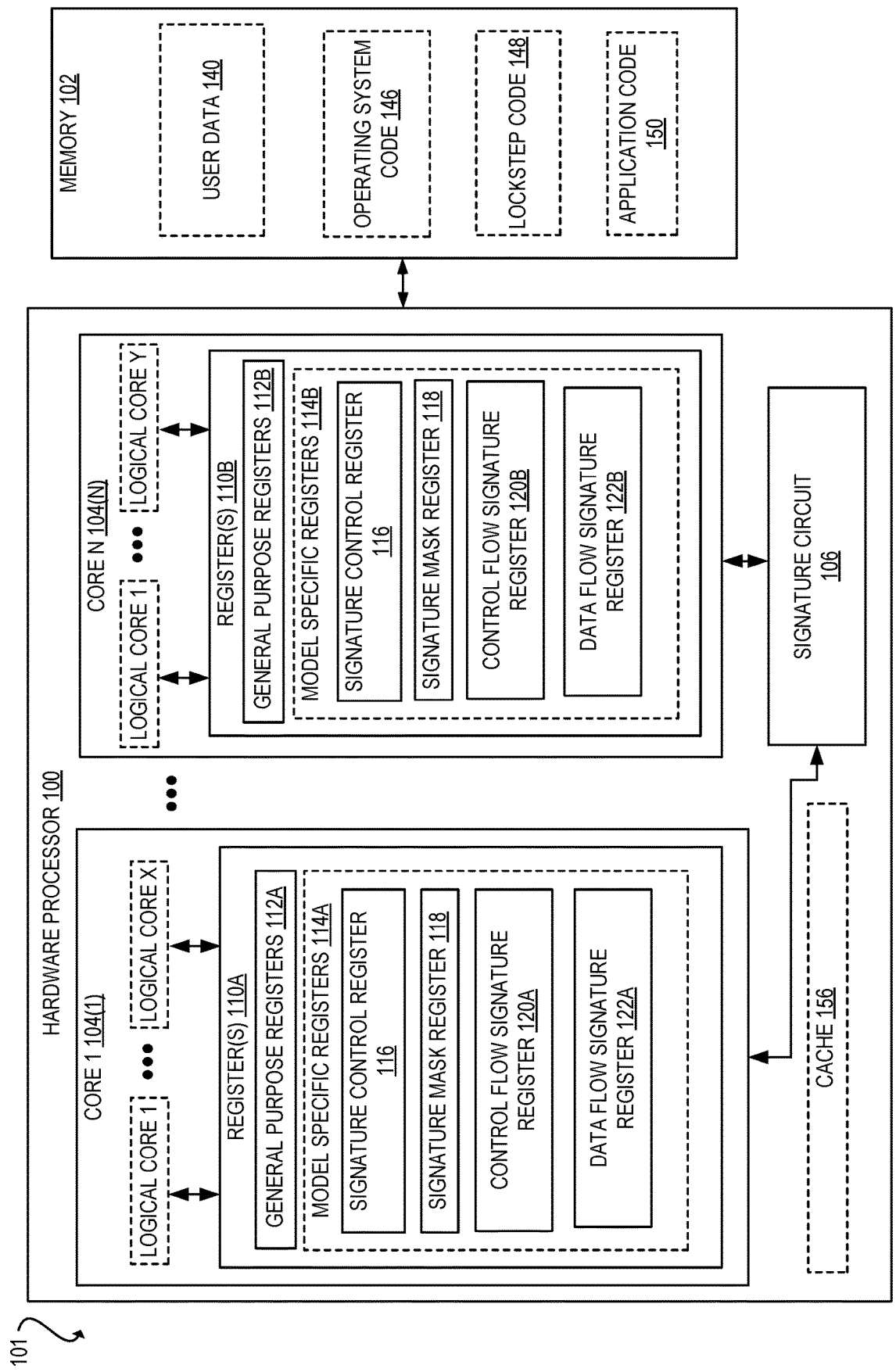
FIG. 1 illustrates a block diagram of a multiple core hardware processor including a signature circuit according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In certain embodiments, multiple processor cores (e.g., central processing units (CPUs)) run a same software (e.g., application) (e.g., simultaneously) to provide for high-reliability execution of the software, such as, but not limited to, software for control of autonomous vehicles. In certain embodiments, each processor core is run in lockstep with the other processor core(s). In one embodiment, hardware lockstep includes a cycle by cycle comparison by the processor of the architectural state of the processor cores and signaling an error if the comparison mismatches. In another embodiment, redundant software is run on each processor core of a plurality of processor cores to compare intermediate results at select intervals.

Certain embodiments herein provide a hardware-assisted software lockstep to detect hardware failures within a fault detection time interval. Certain embodiments herein enable software to detect (e.g., random) hardware failures in a plurality of processor cores (e.g., physical CPUs) that are not running in hardware lockstep. Certain embodiments herein are directed to hardware to enable a software lockstep without having to maintain determinism between the plurality of processor cores, e.g., without using hardware that ensures that the processor cores operate at the same frequency and respond to asynchronous events in the same manner (e.g., power management and throttle events). Certain embodiments herein are directed to hardware to enable a software lockstep without a performance loss on a processor core caused by executing redundant operations, e.g., regardless of whether the software requires this level of reliability. Certain embodiments herein are directed to hardware to enable a software lockstep without the difficulty of solely using a software lockstep in establishing that hardware failures manifest as mismatches in the state being at the chosen point in time, for example, where the state to be compared includes the history of all prior states which leads to a difficult software state analysis and an extensive set of state for comparison. Additionally, a solely hardware lockstep may require processor cores to be physically close to allow for short data routing between the cores and to allow for hardware-based cycle by cycle checking. Certain embodiments herein are directed to hardware to enable a software lockstep without requiring processor cores to be physically close. Certain embodiments herein are directed to hardware to enable a software lockstep without requiring cycle by cycle checking, e.g., but allowing for cycle by cycle collection of data that is to be used in a check.

Certain embodiments herein exploit what hardware and software each are best at. For example, with hardware tracking the state of the processor cores (e.g., at retirement) by performing a state history compression operation (e.g., a cyclic redundancy check) and storing the results in a software-visible set of registers. In one embodiment, the state history compression operation is performed on an instruction (e.g., as it is being retired) and the operand(s) (e.g., register state retired of each core). In certain embodiments, the software running on each core uses thread synchronization (e.g., barriers and/or locks) (e.g., synchronization instructions) to synchronize hardware periodically, read the state history compression results (e.g., CRC values) in the hardware registers of the cores, performs a comparison, and signals any mismatches. This comparison can be done across two CPUs or three or more CPUs (e.g., for a majority vote). Thus, certain embodiments herein offload the difficult task of tracking history of the core state to hardware (e.g., signature hardware). Additionally, the state history compression in the multiple cores to allows a comparison to be selective, e.g., the comparison can be done only on a particular thread, a programmable address range, a software selectable task, etc. Any number of (e.g., a proper subset) of processor cores of a processor can be selected. Thus, certain embodiments herein provide high reliability systems without having to implement a full hardware-based lockstep solution that would burden the cores with unnecessary complexity and hardware.

A cyclic redundancy check (CRC) may include determining a (e.g., short) fixed-length binary sequence, known as the check value or CRC, for each block of data and appending it to the data to form a codeword. In one embodiment, when a codeword is received or read, its check value is either compared with one freshly calculated from the data block, or equivalently, a CRC is performed on the whole codeword and the resulting check value is compared with an expected residue constant. In one embodiment, a CRC operation takes an input of data (e.g., an array of bytes) and outputs a shorter (e.g., 32-bit) unsigned CRC value. For example, by initializing to a starting value (e.g., crc32=0xFFFFFFFF), and for each byte in the input data, perform (where XOR is exclusive OR and SHR is a shift right):

nLookupindex←(crc32 XOR byte) and 0xFF;
crc32←(crc32 shr 8) XOR CRCTable[nLookupindex]
//where CRCTable is an array of //256 32-bit constants
crc32←crc32 xor 0xFFFFFFFF //Finalize the CRCvalue by inverting all the bits return crc32.

Certain embodiments herein are directed to a processor having signature hardware for the cores that includes a set of software visible registers. Certain embodiments herein include one or more control registers programmable by software, e.g., to reset the signature values (e.g., state history compression results) to an initial state across two or more cores in a synchronous manner.

FIG. 1 illustrates a block diagram of a multiple core hardware processor 100 including a signature circuit 106 according to embodiments of the disclosure. Hardware processor 100 includes a plurality of cores 104(1) to 104(N) e.g., where N is any integer greater than one. Hardware processor 100 is depicted as coupled to a memory 102, e.g., forming a computing system 101. A core of (e.g., each core of) hardware processor 100 may include a plurality of logical cores (e.g., logical processing elements or logical processors), for example, where X and Y is any integer 1 or greater. In certain embodiments, each of physical core 104(1) to physical core 104(N) supports multithreading (e.g., executing two or more parallel sets of operations or threads on a first and second logical core), and may do so in a variety of ways including time sliced multithreading, simultaneous multithreading (e.g., where a single physical core provides a respective logical core for each of the threads (e.g., hardware threads) that physical core is simultaneously multithreading), or a combination thereof (e.g., time sliced fetching and decoding and simultaneous multithreading thereafter). In certain embodiments, each logical core appears to software (e.g., the operating system (OS)) as a distinct processing unit, for example, so that the software (e.g., OS) can schedule two processes (e.g., two threads) for concurrent execution.

Depicted hardware processor 100 includes registers 110A of core 104(1) and registers 110B of core 104(N). In certain embodiments, each core includes its own set of registers. Registers 110A may include one or more general purpose (e.g., data) registers 112A to perform (e.g., logic or arithmetic) operations in, for example, additionally or alternatively to accessing (e.g., load or store) data in memory 102. Registers 110B may include one or more general purpose (e.g., data) registers 112B to perform (e.g., logic or arithmetic) operations in, for example, additionally or alternatively to accessing (e.g., load or store) data in memory 102.

Registers 110A may include any combination of signature control register 116, a signature mask register 118, a control flow signature register 120A, and a data flow signature register 122A (e.g., as model specific registers 114A). Registers 110B may include any combination of signature control register 116, a signature mask register 118, a control flow signature register 120B, and a data flow signature register 122B (e.g., as model specific registers 114B). Usage of these registers is described further herein. In one embodiment, a single signature control register 116 and/or a single signature mask register 118 is shared by multiple cores, for example, such that a value written (e.g., at the request of software) to signature control register 116 or signature mask register 118 is the same in each of the cores 104(1) to 104(N).

In one embodiment, current privilege level is stored in a current privilege level (CPL) field of a code segment selector register of registers 110A and registers 110B. In certain embodiments, processor 100 requires a certain level of privilege to perform certain actions, for example, actions requested by a particular core (e.g., actions requested by software running on that particular core).

In one embodiment, one or more (e.g., model specific) registers (e.g., signature control register 116 and signature mask register 118) are (e.g., only) written to at the request of the OS running on the processor, e.g., where the OS operates in privilege (e.g., system) mode but does not operate in non-privilege (e.g., user) mode. In one embodiment, a model specific register can only be written to by software running in supervisor mode, and not by software running in user mode. Registers 110A and 110B may include a register(s) to indicate if the processor (e.g., core) is capable of performing the functionality discussed herein.

In certain embodiments, signature control register 116 and signature mask register 118 are read and write registers, e.g., with a write allowed when the write requestor (e.g., software) has an appropriate (e.g., permitted) privilege level and/or a read allowed for any privilege level. In certain embodiments control flow signature registers 120A-B, and data flow signature registers 122A-B are read only registers, e.g., with a write only allowed by hardware (e.g., not by software) and/or a read allowed by software (e.g., for any privilege level). A register may be read only (e.g., by a core operating in a privilege level below a threshold) or read and write (e.g., writable by a core operating in a privilege level above the threshold). In certain embodiments, read and write registers are readable and writeable only in supervisor privilege level. In certain embodiments, read-only registers are readable only in supervisor privilege level and not writeable for any privilege level.

In certain embodiments, signature circuit 106 is to cause (e.g., when enabled by signature control register 116). In certain embodiments, signature mask register 118 includes a field (e.g., at least one bit) for each core (e.g., physical core or logical core) to indicate when a command to the signature control register 116 applies to that core (e.g., when that field is set to a first value) or does not apply (e.g., when that field is set to a second, different value). In one embodiment when (e.g., control flow) signature functionality is turned on for core 104(1) and core 104(N), signature data is generated by performing a state history operation (e.g., the same operation for both cores) on the corresponding instructions that are being executed (e.g., retired) by each core and the resulting signature data from the instruction executed (e.g., retired) by core 104(1) is stored in control flow signature register 120A of core 104(1) and the resulting signature data from the instruction executed (e.g., retired) by core 104(N) is stored in control flow signature register 120B of core 104(N). Additionally, or alternatively, when (e.g., data flow) signature functionality is turned on for core 104(1) and core 104(N), signature data is generated by performing a state history operation (e.g., the same operation for both cores) on a resultant of the corresponding instructions that are being executed (e.g., retired) by each core and the resulting signature data from the resultant of the instruction executed (e.g., retired) by core 104(1) is stored in data flow signature register 1202 of core 104(1) and the resulting signature data from the resultant of the instruction executed (e.g., retired) by core 104(N) is stored in data flow signature register 122B of core 104(N).

In certain embodiments, a next instruction (or set of instructions) executed (e.g., retired) by core 104(1) and core 104(N) causes an update of control flow signature registers 120A-B. For example, by performing a state history compression operation (e.g., the same operation for both cores) on the corresponding instructions that are being executed (e.g., retired) by each core to produce a result, performing another state history compression operation on that result and the value currently stored in a respective control flow signature register 120A-120B, respectively, and storing the respective, updated control flow signature data in control flow signature register 120A for core 104(1) and in control flow signature register 120B for core 104(N). Additionally, or alternatively, the next instruction (or set of instructions) executed (e.g., retired) by core 104(1) and core 104(N) causes an update of control flow data flow signature registers 122A-B. For example, by performing a state history operation (e.g., the same operation for both cores) on a resultant of the corresponding instructions that are being executed (e.g., retired) by each core to produce a result, performing another state history compression operation on that result and the value currently stored in a respective data flow signature register 122A-122B, respectively, and storing the respective, updated data flow signature data in data flow signature register 122A for core 104(1) and in data flow signature register 122B for core 104(N).

Memory 102 may include user data 140 (e.g., accessible by a user and/or supervisor). Memory 102 may include (e.g., store) one or more of (e.g., any combination of) the following software: operating system (OS) code 146, lockstep code 148, application code 150, or any combination thereof. Application code 150 may be a user program. Application code 150 may be run on cores 104(1) and 104(N). Application code may include a synchronization instruction, for example, that executes at the same line of application code 150 for cores 104(1) and 104(N). In certain embodiments, e.g., when the corresponding synchronization instructions have executed (e.g., retired) for each of cores 104(1) and 104(N), processor 100 executes lockstep code 148, e.g., to compare the data in control flow signature register 120A of core 104(1) to the data in control flow signature register 120B of core 104(1) and/or compare the data in data flow signature register 122A of core 104(1) to the data in data flow signature register 122B of core 104(N). Lockstep code may trigger an error indication (e.g., a fault) when the data in control flow signature register 120A of core 104(1) does not match the data in control flow signature register 120B of core 104(1) and/or the data in data flow signature register 122A of core 104(1) does not match the data in data flow signature register 122B of core 104(N).

In one embodiment, a cache 156 is provided (e.g., within or separate from a core). Cache circuitry 156 may be used to cache data from memory, e.g., to cache a capability table.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In certain embodiments, computing system 101 and/or processor 100 includes one or more of the features and/or components discussed below, e.g., in reference to any Figure herein.

Thus, certain embodiments herein provide for signature control (and generation) hardware to a processor's architecture to track a signature of the execution results and retired instructions. Certain embodiments herein add state history compression operation(s) (e.g., CRC) of the instruction result that is then stored in the re-order buffer in the entry of the instruction, along with the completion information. Certain embodiments herein add a field based on an instruction's result to the re-order buffer. This may be implemented as part of a re-order (e.g., buffer) circuit or as a separate structure, e.g., where the relationship is maintained between an instruction and its results. In one embodiment, upon retiring an instruction (e.g., assuming any faults are addressed), the retiring instructions are read out of the re-order (e.g., buffer) circuit. In certain embodiments, a state history compression operation (e.g., CRC) is performed on the information of the retiring instruction(s) of a single core together with the current state of the control flow signature register (CFSR) for that core, and the results of this operation written back into the CFSR. In certain embodiments, a state history compression operation (e.g., CRC) is performed on the execution results of the retired instruction(s) of a single core together with the current state of the data flow signature register (DFSR), and the results of this operation written back into the DFSR. In certain embodiments, the CFSR contains the (e.g., CRC) signature of all the retired instructions from when the CFSR was last initialized. In certain embodiments, the DFSR contains the (e.g., CRC) signature of all the execution results of all the retired instructions from when the DFSR was last initialized. The CFSR and DFSR are readable by software, e.g., to perform one or more lockstep operations. Additionally, certain embodiments herein provide a signature control register (SCR) that is writable by software to initialize the CFSR and DFSR.

Figure 2:
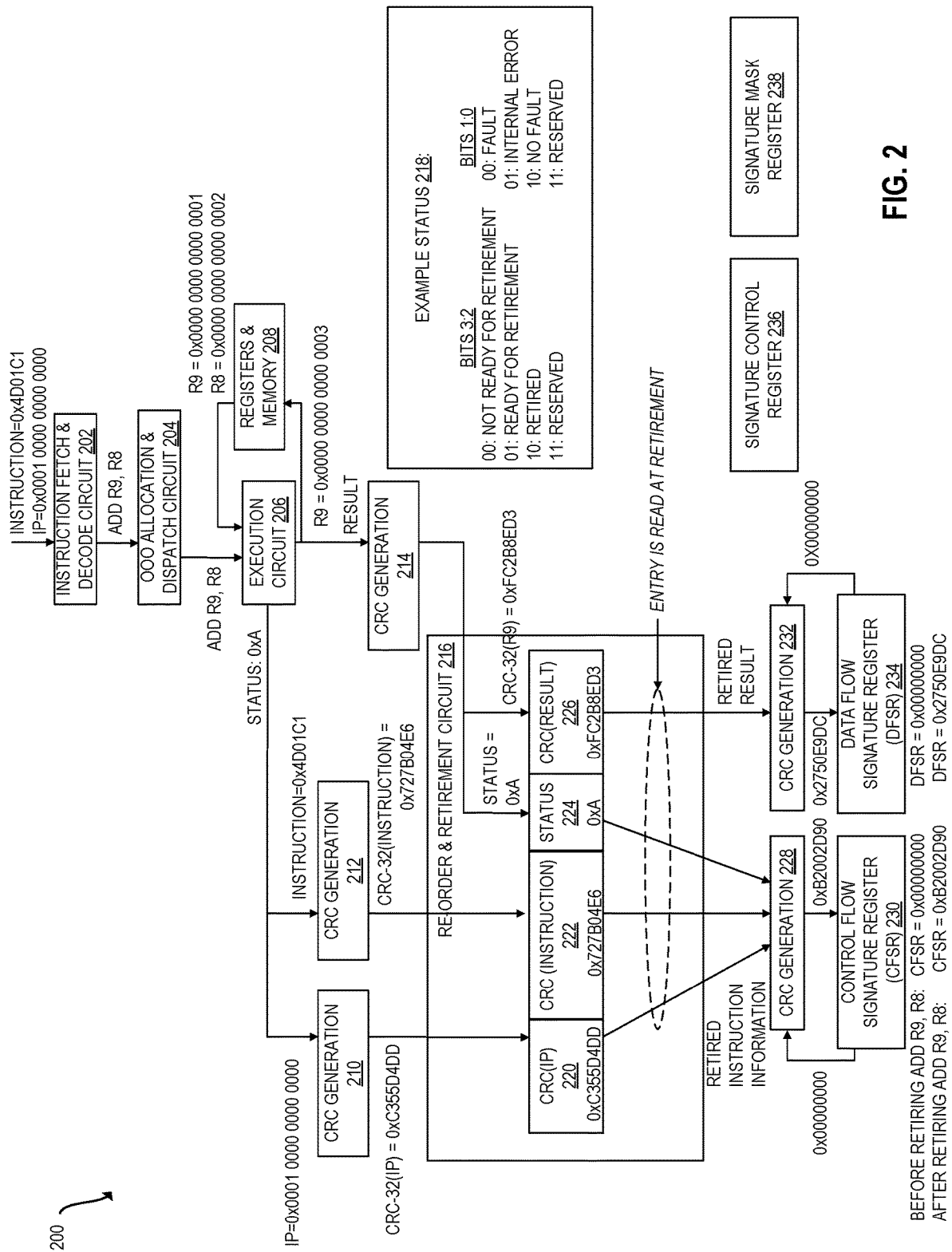
FIG. 2 illustrates a processor core including a control flow signature register and a data flow signature register according to embodiments of the disclosure.

FIG. 2 illustrates a processor core 200 including a control flow signature register 230 and a data flow signature register 234 according to embodiments of the disclosure. In certain embodiments, each of core 104(1) to 104(N) in FIG. 1 is an instance of core 200 in FIG. 2, e.g., with control flow signature register 120A or 120B as an instance of control flow signature register 230 and with data flow signature register 122A or 122B as an instance of data flow signature register 234. In FIG. 2, example values are provided to indicate an example utilization of core 200, however, it should be understood those values are merely examples.

In one embodiment, the core includes out-of-order dispatch and in-order (e.g., in program order) retirement of instructions. In one embodiment, instructions are allocated resources for execution and entries in a reorder buffer whose job it is to retire instructions in program order, e.g., where the re-order buffer also receives completion information such as possible faults generated during execution.

Core 200 includes an instruction fetch and decode circuit 202 to fetch and decode an instruction (e.g., from application code 150 in FIG. 1). The example instruction is an add instruction that is to add the value from register R8 to the value from register R9 and store the resultant into register R9. The decoded instruction in this example is then sent to out-of-order allocation and dispatch circuit 204, e.g., and then scheduled for execution on execution circuit 206. In the depicted example, R8 register of registers and memory 208 stores the value of two, and R9 register of registers and memory 208 initially stores the value of one, so the execution circuit 206 determines a resultant value of three, and then sends that value of three to be stored in R9 register of registers and memory 208.

In certain embodiments, once the execution circuit 206 determines the result (e.g., and the value is stored in R9 or is queued to be stored in R9) that status may be updated to indicate that instruction is ready for retirement, e.g., with a status of 0xA indicating a binary of 1010 which means retired according to bits [3:2] being 1 0 and no fault according to bits [1:0] being 10. Example status legend 218 is merely an example.

Thus, assuming that core 200 has its signature hardware (e.g., signature generation components 210, 212, 214, 228, 230, 232, 234, or any combination thereof) enabled, signature generation begins. In one embodiment, signature control register 236 (e.g., and signature mask register 238) stores an enable value (e.g., instead of a disable value) to enable the signature hardware in a core (e.g., signature generation components 210, 212, 214, 228, 230, 232, 234, or any combination thereof). In one embodiment, signature circuit 106 controls the enablement and disablement of the signature hardware in a core, e.g., according to the value(s) stored in signature control register 116 (e.g., as an instance of signature control register 236), for example, and according to the value(s) stored in signature mask register 118 (e.g., as an instance of signature mask register 238)

In FIG. 2, the example state history compression operation is a CRC operation, but it should be understood other state history compression operations may be used. State history compression operation (e.g., CRC) generation circuit 210 is to receive as input an instruction pointer (IP) of the instruction having its signature generated (e.g., after execution) and the resultant value 220 is stored in re-order and retirement circuit 216. State history compression operation (e.g., CRC) generation circuit 212 is to receive as input one or more fields of the instruction having its signature generated (e.g., after execution) and the resultant value 222 is stored in re-order and retirement circuit 216 (e.g., in the same entry for resultant value 220). State history compression operation (e.g., CRC) generation circuit 214 is to receive as input the resultant of the instruction having its signature generated (e.g., after execution) and the resultant value 226 is stored in re-order and retirement circuit 216 (e.g., in the same entry for resultant value 220 and resultant value 222). In certain embodiments, the status value 224 is updated with the status (e.g., 0xA in this example). It should be understood that a plurality of entries (e.g., lines) may be included in re-order and retirement circuit 216 with an entry for each instruction that is pending retirement.

Once an instruction is ready for retirement (e.g., the resultant value of three being visible in register R9), state history compression operation (e.g., CRC) generation circuit 228 is to receive as input the resultant value 220 from the IP, the resultant value 222 from the instruction, the status value 224 (or any combination thereof) and the previous value stored in control flow signature register 230 (which may be zero after being reset), and the resultant value (e.g., 0xB2002D90) is stored in control flow signature register 230. Additionally, or alternatively, state history compression operation (e.g., CRC) generation circuit 232 is to receive as input the resultant value 226 from the instruction's resultant and the previous value stored in data flow signature register 234 (which may be zero after being reset), and the resultant value (e.g., 0x2750E9DC) is stored in data flow signature register 234.

In certain embodiments, the fields of the instruction input into state history compression operation (e.g., CRC) generation circuit 212 are the values from any field discussed herein, for example, in FIGS. 11A-12D. The field(s) may include the opcode, prefixes, ModR/M, Scale/Index/Base (SIB), etc.). In certain embodiments, the state history compression operations (e.g., CRC) by circuits 210, 212, 214, or any combination thereof are not performed, e.g., but state history compression operation (e.g., CRC) is performed by circuit 228 and/or circuit 232. In one embodiment, circuit 210 is to perform a state history compression operation (e.g., CRC) when the instruction pointer format (e.g., IP address space) is greater than a threshold value, e.g., and not perform the state history compression operation (e.g., CRC) when the instruction pointer format (e.g., IP address space) is less than (or equal to) the threshold value. In one embodiment, circuit 212 is to perform a state history compression operation (e.g., CRC) when the instruction format is greater than a threshold value, e.g., and not perform the state history compression operation (e.g., CRC) when the instruction format is less than (or equal to) the threshold value.

FIG. 3 illustrates an example format 300 for a control flow signature register (CFSR) according to embodiments of the disclosure. Format 300 is to store a signature (e.g., CRC) value for the instructions retired by a core since the CFSR for that core was last initialized. Format 300 has the attribute of read only (RO) to indicate that the CFSR can be read by software but not written to.

FIG. 4 illustrates an example format 400 for a data flow signature register (DFSR) according to embodiments of the disclosure. Format 400 is to store a signature (e.g., CRC) value for the resultants of the execution of the instructions retired by a core since the DFSR for that core was last initialized. Format 400 has the attribute of read only (RO) to indicate that the DFSR can be read by software but not written to.

FIG. 5 illustrates an example format 500 for a signature mask signature register (SMR) according to embodiments of the disclosure. Format 500 is to store a mask value where a respective field (e.g., bit of multiple bits) indicate which core(s) (e.g., CPU(s)) to which the signature control register command is applied, e.g., with a bit set (e.g., to one) to indicate that the command written to the signature control register will apply to that core (e.g., CPU) and a bit cleared (e.g., set to zero) indicates that the command written to signature control register will not apply to that core (e.g., CPU). In certain embodiments, one SMR is shared for all cores (e.g., CPUs). Format 500 has the attribute of read and write (RW) to indicate that the SMR can be read and written to by software.

FIG. 6 illustrates an example format 600 for a signature control register (SCR) according to embodiments of the disclosure. Format 600 is to store a command value to indicate the command being sent to each core (e.g., according to the SMR mask), e.g., with a first value (e.g., 00b) to initialize CFSR and DFSR (e.g., clear their values to zero), with a second value (e.g., 01b) to begin updates to CFSR and DFSR, and a third value (e.g., 10b) to stop updates to CFSR and DFSR.

In certain embodiments, a system uses the signature values to detect failures in the data flow and control flow. In one embodiment, software writes to the SCR to initialize the CFSR and DFSR for both core_1 and core_2, and then writes to the SCR to enable updates to the CFSR and DFSR of core_1 and the CFSR and DFSR of core_1. In certain embodiments, core_1 and core_2 begin updating their CFSR and DFSR with retired instructions. In one embodiment, the core_1 and core_2 begin executing the same software (e.g., that requires highly reliable hardware). Throughout this execution, core_1 and core_2 update their respective CFSR and DFSR in certain embodiments. Core_1 and core_2 then may execute hardware synchronization via a software barrier (e.g., chosen by the software developer). In certain embodiments, software writes the SCR to stop updates to the CFSR and DFSR of each of core_1 and core_2. In certain embodiments, software then reads the CFSR and DFSR of core_1 and core_2 and compares them, and if there were no random hardware faults that resulted in unexpected changes in the instruction flow (e.g., control flow changes), the value in CFSR of core_1 matches that of the value in CFSR of core_2, and if there were no random hardware faults that resulted in unexpected changes in the instructions results, the value in DFSR of core_1 matches that of the value in DFSR of core_2. In certain embodiments, if the results do not match, software signals an undetected error to the system. The process can then be repeated with the next section of software, e.g., software that requires high reliability processor hardware. In one embodiment, if an error is detected from the CFSR and DFSR of each of core_1 and core_2, the instruction flow generates a fault or trap of both core_1 and core_2 and executes an exception handler. In one embodiment, if an error is detected from the CFSR and DFSR of each of core_1 and core_2, a user-defined interrupt is delivered to both core_1 and core_2, e.g., to follow the same behavior as the fault and trap case. In one embodiment, an abort does not allow a restart of the program, e.g., independently of the state of the CFSR and DFSR.

Figure 7:
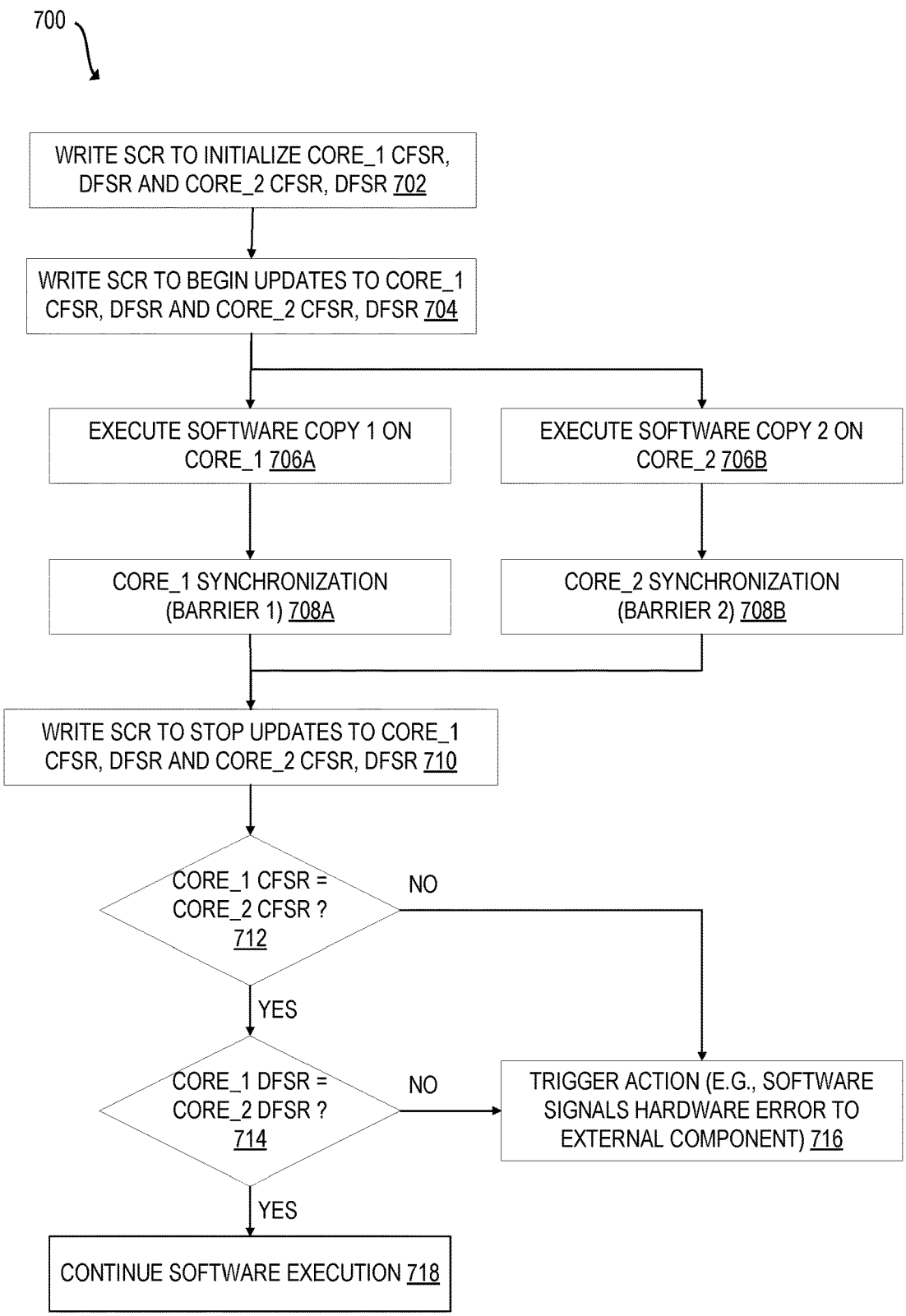
FIG. 7 illustrates a method of performing lockstep for two processor cores according to embodiments of the disclosure.

FIG. 7 illustrates a method 700 of performing lockstep for two processor cores according to embodiments of the disclosure. Method 700 includes a write of an initialization value to SCR (e.g., SCR 116 in FIG. 1) to initialize core_1 CFSR (e.g., CFSR 120A in FIG. 1) and DFSR (e.g., DFSR 122A in FIG. 1) and core_2 CFSR (e.g., CFSR 120B in FIG. 1) and DFSR (e.g., DFSR 122B in FIG. 1) at 702. Method 700 further includes a write of a "begin" value to SCR (e.g., SCR 116 in FIG. 1) to begin updates to core_1 CFSR (e.g., CFSR 120A in FIG. 1) and DFSR (e.g., DFSR 122A in FIG. 1) and to core_2 CFSR (e.g., CFSR 120B in FIG. 1) and DFSR (e.g., DFSR 122B in FIG. 1) at 704. Core_1 thus begins to execute software (copy 1) at 706A in parallel with core_2 beginning to execute the same software (copy 2) at 706B. The software may be application code 150 in FIG. 1. After one or more instructions (e.g., a block of multiple blocks of software) are executed (and retired), in certain embodiments the method is to cause core_1 to execute a synchronization instruction (e.g., barrier 1) at 708A and core_2 to execute a synchronization instruction (e.g., barrier 2) at 708B, e.g., the barriers being at the same line of code within the software. Method 700 then includes a write of an "end" value to SCR (e.g., SCR 116 in FIG. 1) to stop updates of core_1 CFSR (e.g., CFSR 120A in FIG. 1) and DFSR (e.g., DFSR 122A in FIG. 1) and to core_2 CFSR (e.g., CFSR 120B in FIG. 1) and DFSR (e.g., DFSR 122B in FIG. 1) at 710. Method 700 then compares the core_1 CFSR (e.g., CFSR 120A in FIG. 1) and core_2 CFSR (e.g., CFSR 120B in FIG. 1) and if they match, proceeds to 714 and if the values do not match, triggers an action (for example, software signals (e.g., sends an error indication for) a hardware error to an external component, such as, but not limited to, a microcontroller for handling error messaging and/or a failover system) at 716. Method 700 then compares the core_1 DFSR (e.g., DFSR 122A in FIG. 1) and core_2 DFSR (e.g., DFSR 122B in FIG. 1) and if they match, proceeds to 718 to continue software execution (e.g., and thus return to 706A and 706B) and if the values do not match, triggers an action (e.g., software signals a hardware error to an external component, such as, but not limited to, a microcontroller for handling error messaging and/or a failover system) at 716.

Figure 8:
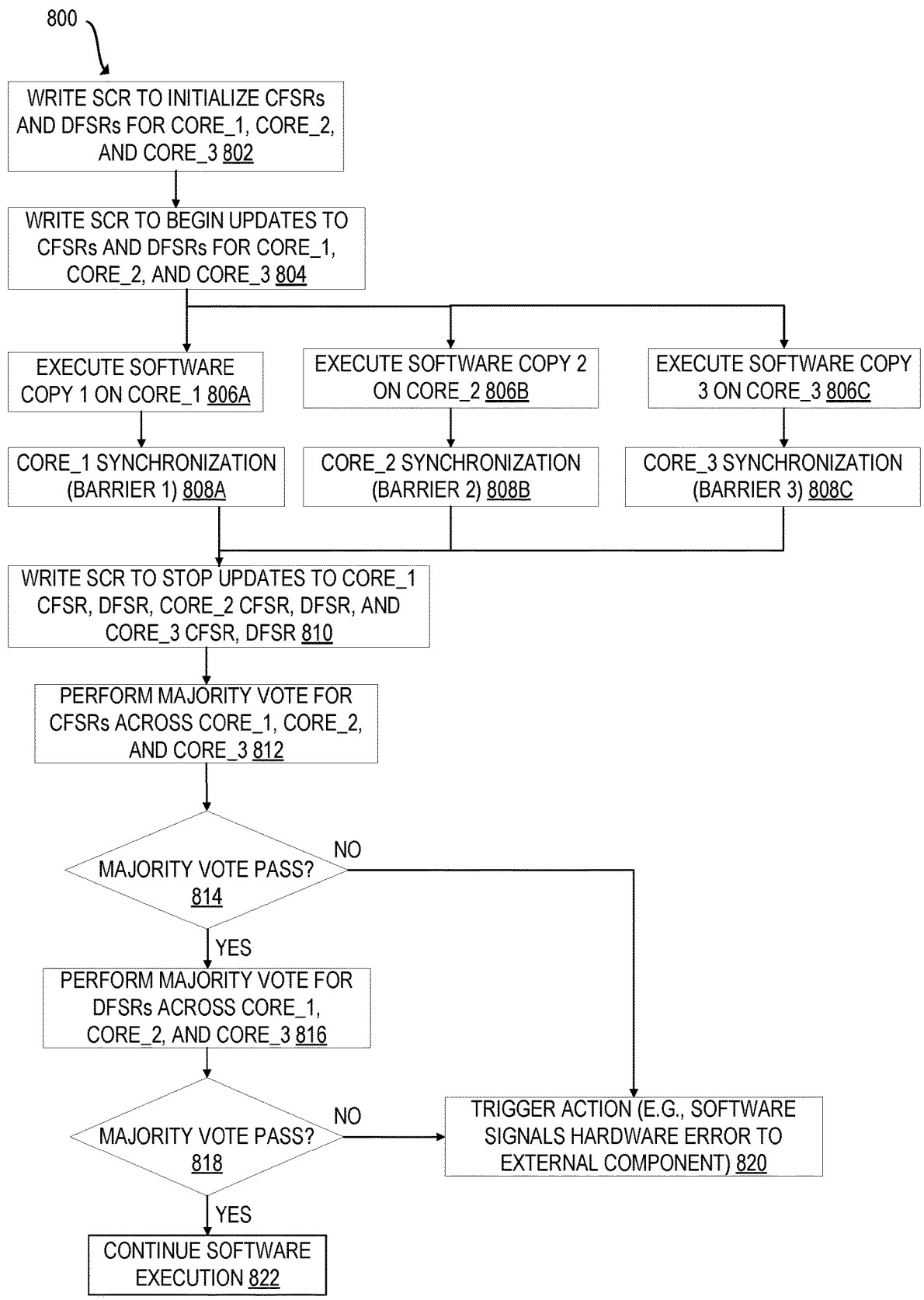
FIG. 8 illustrates a method of performing lockstep for three processor cores according to embodiments of the disclosure.

FIG. 8 illustrates a method 800 of performing lockstep for three processor cores according to embodiments of the disclosure. Method 800 includes a write of an initialization value to SCR (e.g., SCR 116 in FIG. 1) to initialize core_1 CFSR and DFSR, core_2 CFSR and DFSR, and core_3 CFSR and DFSR at 802. Method 800 further includes a write of a "begin" value to SCR to begin updates to core_1 CFSR and DFSR, core_2 CFSR and DFSR, and core_3 CFSR and DFSR at 804. Core_1 thus begins to execute software (copy 1) at 806A in parallel with core_2 beginning to execute the same software (copy 2) at 806B in parallel with core_3 beginning to execute the same software (copy 3) at 806C. The software may be application code 150 in FIG. 1. After one or more instructions (e.g., a block of multiple blocks of software) are executed (and retired), in certain embodiments the method is to cause core_1 to execute a synchronization instruction (e.g., barrier 1) at 808A, core_2 to execute a synchronization instruction (e.g., barrier 2) at 808B, and core_3 to execute a synchronization instruction (e.g., barrier 3) at 808C, e.g., the barriers being at the same line of code within the software. Method 800 then includes a write of an "end" value to SCR to stop updates of core_1 CFSR and DFSR, core_2 CFSR and DFSR, and core_3 CFSR and DFSR at 810.

Method 800 then performs a majority vote of the core_1 CFSR, core_2 CFSR, and core_3 CFSR at 812, and if the majority (e.g., two in a three core example) match at 814, proceeds to 816 and if the values do not match, triggers an action (e.g., software signals (e.g., sends an error indication for) a hardware error to an external component, such as, but not limited to, a microcontroller for handling error messaging and/or a failover system) at 820. Method 800 then performs a majority vote of the core_1 DFSR, core_2 DFSR, and core_3 DFSR at 816, and if the majority (e.g., two in a three core example) match at 818, proceeds to 822 to continue software execution (e.g., and thus return to 806A, 806B, and 806C) and if the values do not match, triggers an action (e.g., software signals a hardware error to an external component, such as, but not limited to, a microcontroller for handling error messaging and/or a failover system) at 820.

Figure 9:
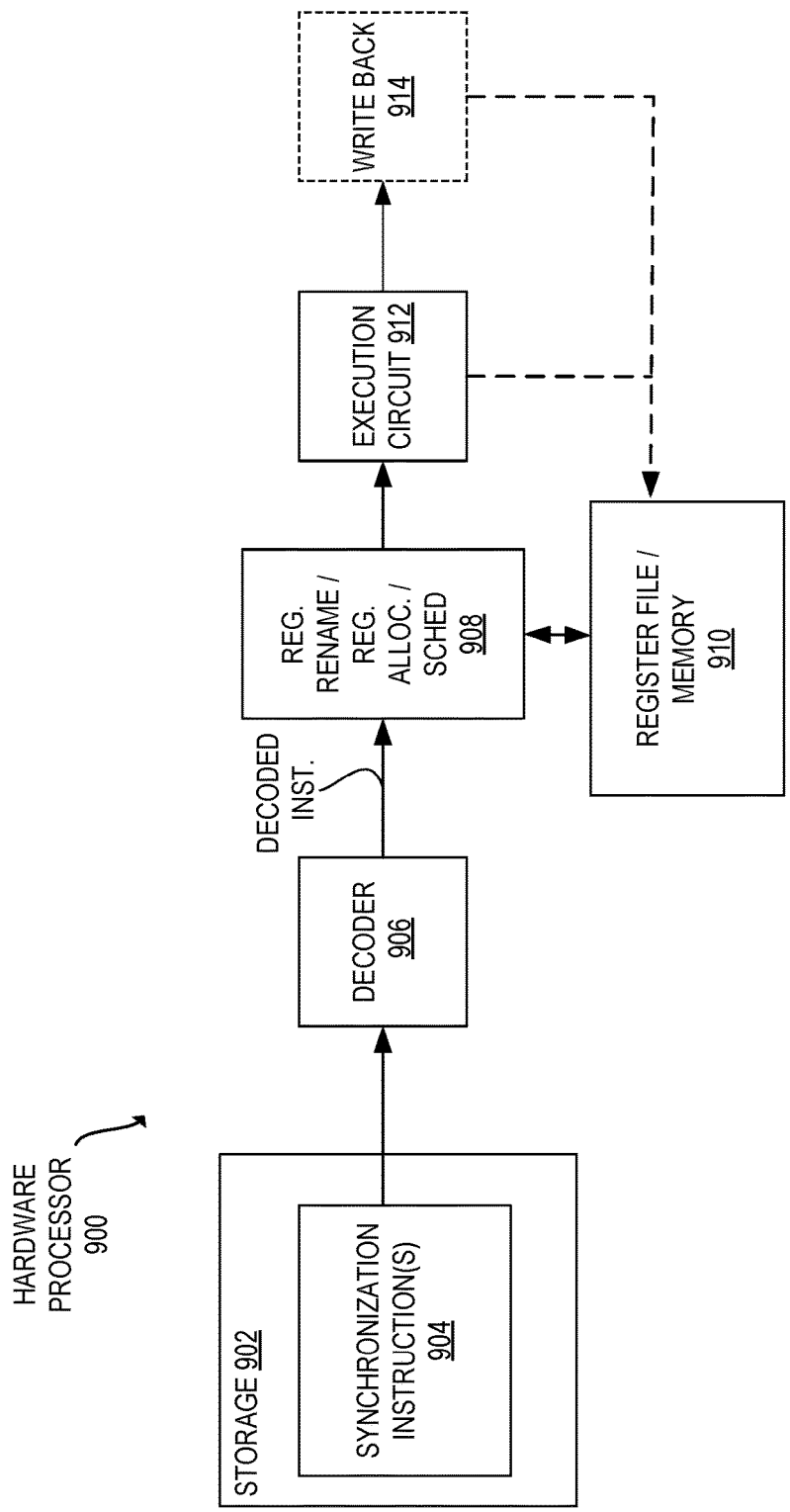
FIG. 9 is a block flow diagram illustrating execution of a synchronization instruction according to embodiments of the disclosure.

FIG. 9 is a block flow diagram 900 illustrating execution of a synchronization instruction 904 according to embodiments of the disclosure. In one embodiment, e.g., in response to a request to perform an operation, the synchronization instruction (e.g., macro-instruction) 904 is fetched from storage 902 and sent to decoder 906 (e.g., decoder circuit 202 in FIG. 2). In the depicted embodiment, the decoder 906 (e.g., decoder circuit) decodes the instruction into a decoded instruction (e.g., one or more micro-instructions or micro-operations). The decoded instruction is then sent for execution, e.g., via scheduler circuit 908 to schedule the decoded instruction for execution.

In certain embodiments, (e.g., where the processor/core supports out-of-order (OoO) execution), the processor includes a register rename/allocator circuit coupled to register file/memory circuit 910 (e.g., unit) to allocate resources and perform register renaming on registers (e.g., registers associated with the instruction). In certain embodiments, (e.g., for out-of-order execution), the processor includes one or more scheduler circuits 908 coupled to the decoder. The scheduler circuit(s) may schedule one or more operations associated with decoded instructions, including one or more operations decoded from a synchronization instruction, for execution on the execution circuit 912.

In certain embodiments, a write back circuit 914 is included to write back results of an instruction to a destination (e.g., write them to a register(s) and/or memory), for example, so those results are visible within a processor (e.g., visible outside of the execution circuit that produced those results).

One or more of these components (e.g., decoder 906, register rename/register allocator/scheduler 908, execution circuit 912, register file/memory 910, or write back circuit 314) may be in a single core of a hardware processor (e.g., and multiple cores each with an instance of these components).

In certain embodiments, execution of the synchronization instruction 904 causes the core to stop executing instructions, e.g., as a barrier or fence.

Figure 10:
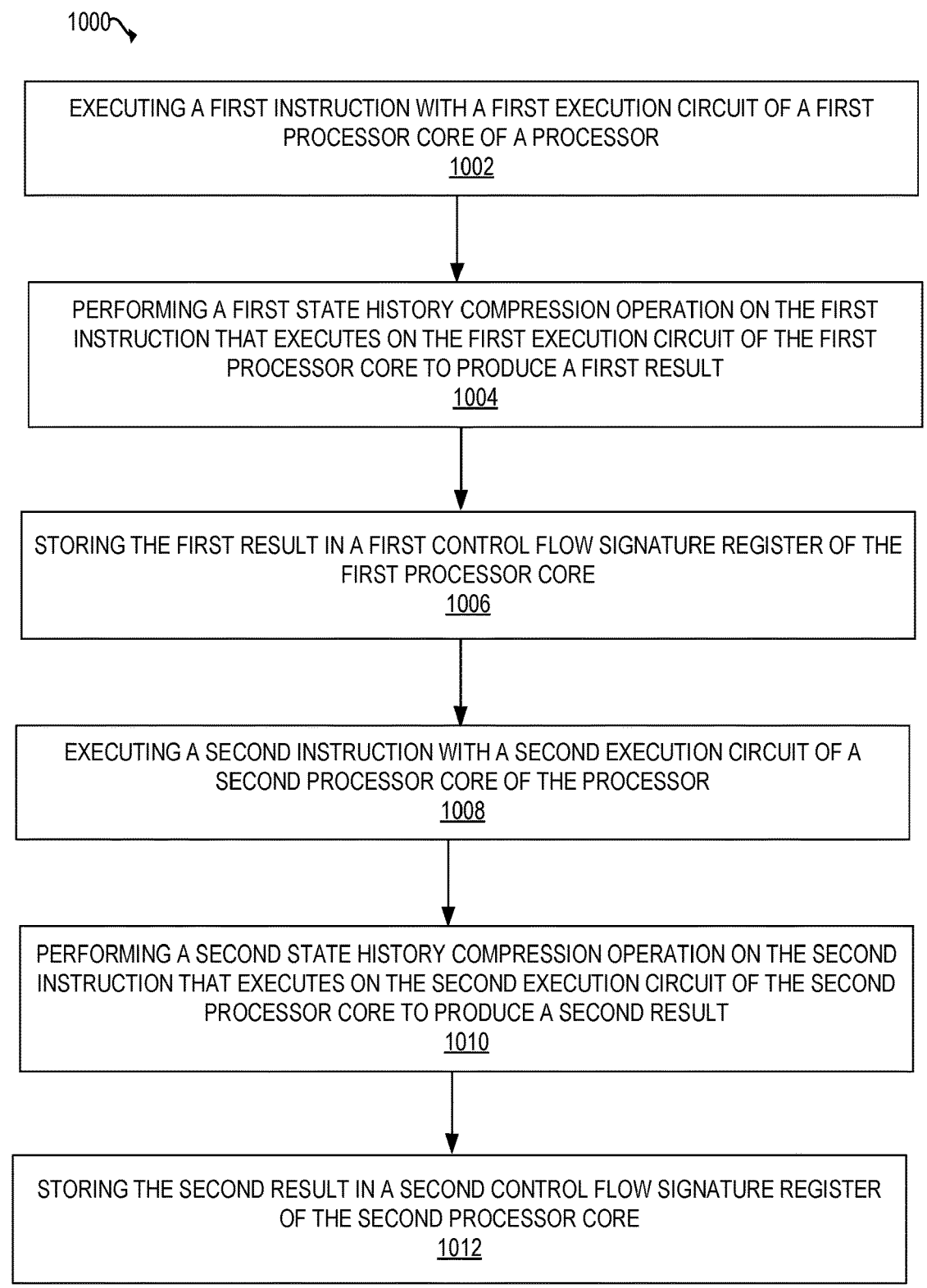
FIG. 10 illustrates a method of updating a control flow signature register of a first processor core and a control flow signature register of a second processor core according to embodiments of the disclosure.

FIG. 10 illustrates a method 1000 of updating a control flow signature register of a first processor core and a control flow signature register of a second processor core according to embodiments of the disclosure. Depicted method 1000 includes executing a first instruction with a first execution circuit of a first processor core of a processor 1002, performing a first state history compression operation on the first instruction that executes on the first execution circuit of the first processor core to produce a first result 1004, storing the first result in a first control flow signature register of the first processor core 1006, executing a second instruction with a second execution circuit of a second processor core of the processor 1008, performing a second state history compression operation on the second instruction that executes on the second execution circuit of the second processor core to produce a second result 1010, and storing the second result in a second control flow signature register of the second processor core 1012.

Exemplary architectures, systems, etc. that the above may be used in are detailed below.

At least some embodiments of the disclosed technologies can be described in view of the following examples:

Example 1. A hardware processor comprising:
a first processor core comprising a first control flow signature register and a first execution circuit;
a second processor core comprising a second control flow signature register and a second execution circuit; and
at least one signature circuit to:

perform a first state history compression operation on a first instruction that executes on the first execution circuit of the first processor core to produce a first result,
store the first result in the first control flow signature register,
perform a second state history compression operation on a second instruction that executes on the second execution circuit of the second processor core to produce a second result, and
store the second result in the second control flow signature register.

Example 2. The hardware processor of example 1, wherein the at least one signature circuit is to:
perform a third state history compression operation on a third instruction that executes on the first execution circuit of the first processor core to produce a third result,
perform a fourth state history compression operation on the first result and the third result to produce a fourth result,
store the fourth result in the first control flow signature register,
perform a fifth state history compression operation on a fourth instruction that executes on the second execution circuit of the second processor core to produce a fifth result,
perform a sixth state history compression operation on the second result and the fifth result to produce a sixth result, and
store the sixth result in the second control flow signature register.

Example 3. The hardware processor of example 1, wherein the first state history compression operation is performed on an opcode and an operand of the first instruction.

Example 4. The hardware processor of example 1, further comprising decoding an instruction with a decoder of the first processor core into a decoded instruction and executing the decoded instruction with the first execution circuit of the first processor core to compare the first result in the first control flow signature register and the second result in the second control flow signature register, and trigger an error indication when the first result differs from the second result.

Example 5. The hardware processor of example 1, wherein the first processor core comprises a first data flow signature register, the second processor core comprises a second data flow signature register, and the at least one signature circuit is to:
perform a third state history compression operation on a resultant of the first instruction that executes on the first execution circuit of the first processor core to produce a third result,
store the third result in the first data flow signature register,
perform a fourth state history compression operation on a resultant of the second instruction that executes on the second execution circuit of the second processor core to produce a fourth result, and
store the fourth result in the second data flow signature register.

Example 6. The hardware processor of example 5, further comprising decoding an instruction with a decoder of the first processor core into a decoded instruction and executing the decoded instruction with the first execution circuit of the first processor core to compare the first result in the first control flow signature register and the second result in the second control flow signature register, compare the third result in the first data flow signature register and the fourth result in the second data flow signature register, and trigger an error indication when the first result differs from the second result or when the third result differs from the fourth result.

Example 7. The hardware processor of example 5, wherein the at least one signature circuit is to:
perform a fifth state history compression operation on a resultant of a third instruction that executes on the first execution circuit of the first processor core to produce a fifth result,
perform a sixth state history compression operation on the third result and the fifth result to produce a sixth result,
store the sixth result in the first data flow signature register,
perform a seventh state history compression operation on a resultant of a fourth instruction that executes on the second execution circuit of the second processor core to produce a seventh result,
perform an eighth state history compression operation on the fourth result and the seventh result to produce an eighth result, and
store the eighth result in the second data flow signature register.

Example 8. The hardware processor of example 1, wherein the first state history compression operation on the first instruction comprises a first cyclic redundancy check on an instruction pointer of the first instruction and a second cyclic redundancy check on at least one field of the first instruction to produce the first result.

Example 9. A method comprising:
executing a first instruction with a first execution circuit of a first processor core of a processor;
performing a first state history compression operation on the first instruction that executes on the first execution circuit of the first processor core to produce a first result;
storing the first result in a first control flow signature register of the first processor core;
executing a second instruction with a second execution circuit of a second processor core of the processor;
performing a second state history compression operation on the second instruction that executes on the second execution circuit of the second processor core to produce a second result; and
storing the second result in a second control flow signature register of the second processor core.

Example 10. The method of example 9, further comprising:
performing a third state history compression operation on a third instruction that executes on the first execution circuit of the first processor core to produce a third result;
performing a fourth state history compression operation on the first result and the third result to produce a fourth result;
storing the fourth result in the first control flow signature register;
performing a fifth state history compression operation on a fourth instruction that executes on the second execution circuit of the second processor core to produce a fifth result;
performing a sixth state history compression operation on the second result and the fifth result to produce a sixth result; and
storing the sixth result in the second control flow signature register.

Example 11. The method of example 9, wherein the first state history compression operation is performed on an opcode and an operand of the first instruction.

Example 12. The method of example 9, further comprising:
decoding an instruction with a decoder of the first processor core into a decoded instruction; and
executing the decoded instruction with the first execution circuit of the first processor core to compare the first result in the first control flow signature register and the second result in the second control flow signature register, and trigger an error indication when the first result differs from the second result.

Example 13. The method of example 9, further comprising:
performing a third state history compression operation on a resultant of the first instruction that executes on the first execution circuit of the first processor core to produce a third result,
storing the third result in a first data flow signature register of the first processor core;
performing a fourth state history compression operation on a resultant of the second instruction that executes on the second execution circuit of the second processor core to produce a fourth result; and
storing the fourth result in a second data flow signature register of the second processor core.

Example 14. The method of example 13, further comprising:
decoding an instruction with a decoder of the first processor core into a decoded instruction; and
executing the decoded instruction with the first execution circuit of the first processor core to compare the first result in the first control flow signature register and the second result in the second control flow signature register, compare the third result in the first data flow signature register and the fourth result in the second data flow signature register, and trigger an error indication when the first result differs from the second result or when the third result differs from the fourth result.

Example 15. The method of example 13, further comprising:
performing a fifth state history compression operation on a resultant of a third instruction that executes on the first execution circuit of the first processor core to produce a fifth result;
performing a sixth state history compression operation on the third result and the fifth result to produce a sixth result;
storing the sixth result in the first data flow signature register;
performing a seventh state history compression operation on a resultant of a fourth instruction that executes on the second execution circuit of the second processor core to produce a seventh result;
performing an eighth state history compression operation on the fourth result and the seventh result to produce an eighth result; and
storing the eighth result in the second data flow signature register.

Example 16. The method of example 9, wherein the performing the first state history compression operation on the first instruction comprises performing a first cyclic redundancy check on an instruction pointer of the first instruction and a second cyclic redundancy check on at least one field of the first instruction to produce the first result.

Example 17. A non-transitory machine readable medium that stores program code that when executed by a machine causes the machine to perform a method comprising:
executing a first instruction with a first execution circuit of a first processor core of a processor;
performing a first state history compression operation on the first instruction that executes on the first execution circuit of the first processor core to produce a first result;
storing the first result in a first control flow signature register of the first processor core;
executing a second instruction with a second execution circuit of a second processor core of the processor;
performing a second state history compression operation on the second instruction that executes on the second execution circuit of the second processor core to produce a second result; and
storing the second result in a second control flow signature register of the second processor core.

Example 18. The non-transitory machine readable medium of example 17, wherein the method further comprises:
performing a third state history compression operation on a third instruction that executes on the first execution circuit of the first processor core to produce a third result;
performing a fourth state history compression operation on the first result and the third result to produce a fourth result;
storing the fourth result in the first control flow signature register;
performing a fifth state history compression operation on a fourth instruction that executes on the second execution circuit of the second processor core to produce a fifth result;
performing a sixth state history compression operation on the second result and the fifth result to produce a sixth result; and
storing the sixth result in the second control flow signature register.

Example 19. The non-transitory machine readable medium of example 17, wherein the first state history compression operation is performed on an opcode and an operand of the first instruction.

Example 20. The non-transitory machine readable medium of example 17, wherein the method further comprises:
decoding an instruction with a decoder of the first processor core into a decoded instruction; and
executing the decoded instruction with the first execution circuit of the first processor core to compare the first result in the first control flow signature register and the second result in the second control flow signature register, and trigger an error indication when the first result differs from the second result.

Example 21. The non-transitory machine readable medium of example 17, wherein the method further comprises:
performing a third state history compression operation on a resultant of the first instruction that executes on the first execution circuit of the first processor core to produce a third result,
storing the third result in a first data flow signature register of the first processor core;
performing a fourth state history compression operation on a resultant of the second instruction that executes on the second execution circuit of the second processor core to produce a fourth result; and
storing the fourth result in a second data flow signature register of the second processor core.

Example 22. The non-transitory machine readable medium of example 21, wherein the method further comprises:
decoding an instruction with a decoder of the first processor core into a decoded instruction; and
executing the decoded instruction with the first execution circuit of the first processor core to compare the first result in the first control flow signature register and the second result in the second control flow signature register, compare the third result in the first data flow signature register and the fourth result in the second data flow signature register, and trigger an error indication when the first result differs from the second result or when the third result differs from the fourth result.

Example 23. The non-transitory machine readable medium of example 21, wherein the method further comprises:
performing a fifth state history compression operation on a resultant of a third instruction that executes on the first execution circuit of the first processor core to produce a fifth result;
performing a sixth state history compression operation on the third result and the fifth result to produce a sixth result;
storing the sixth result in the first data flow signature register;
performing a seventh state history compression operation on a resultant of a fourth instruction that executes on the second execution circuit of the second processor core to produce a seventh result;
performing an eighth state history compression operation on the fourth result and the seventh result to produce an eighth result; and
storing the eighth result in the second data flow signature register.

Example 24. The non-transitory machine readable medium of example 17, wherein the performing the first state history compression operation on the first instruction comprises performing a first cyclic redundancy check on an instruction pointer of the first instruction and a second cyclic redundancy check on at least one field of the first instruction to produce the first result.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
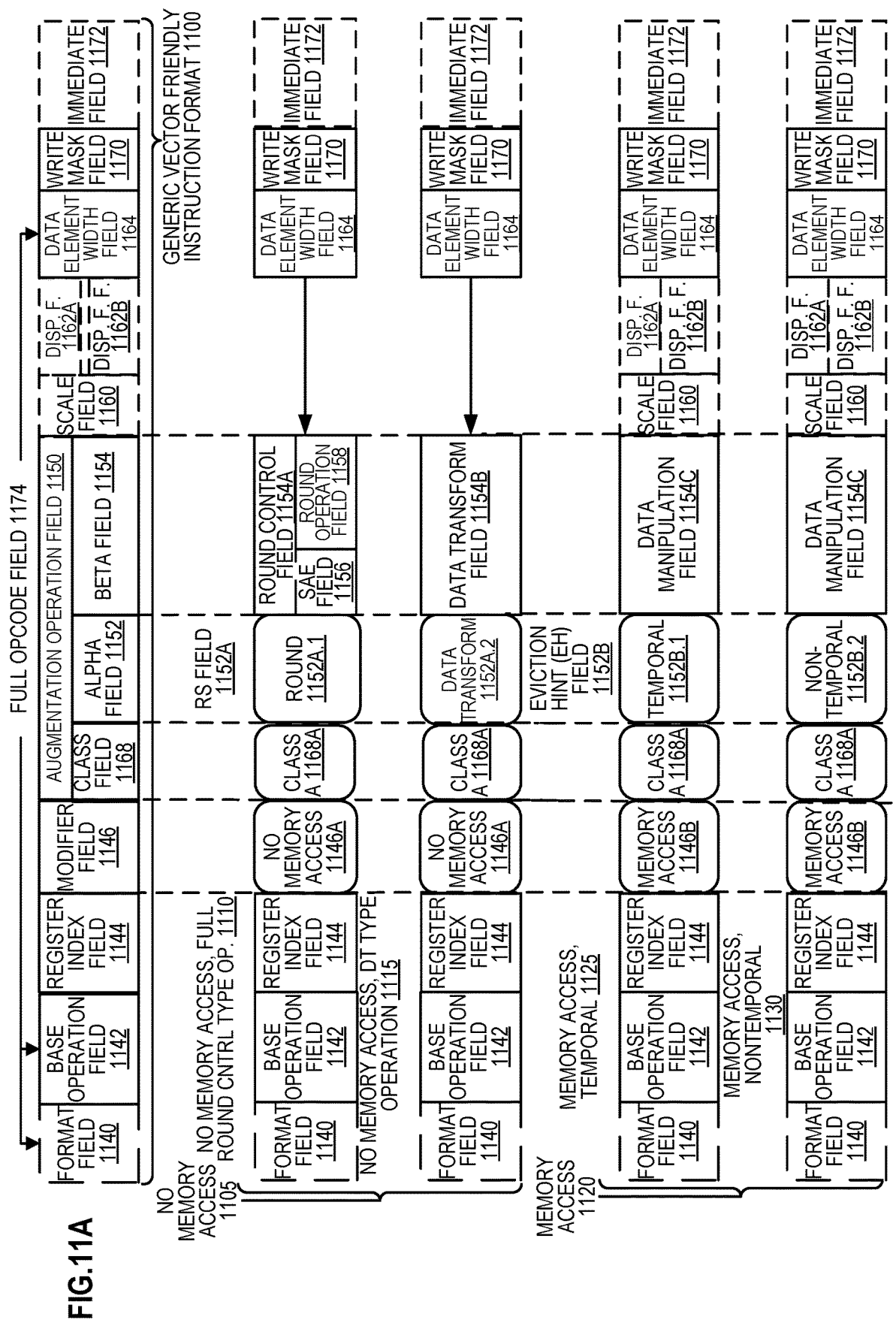
FIG. 11A is a block diagram illustrating a generic vector friendly instruction format and class A instruction templates thereof according to embodiments of the disclosure.
Figure 11B:
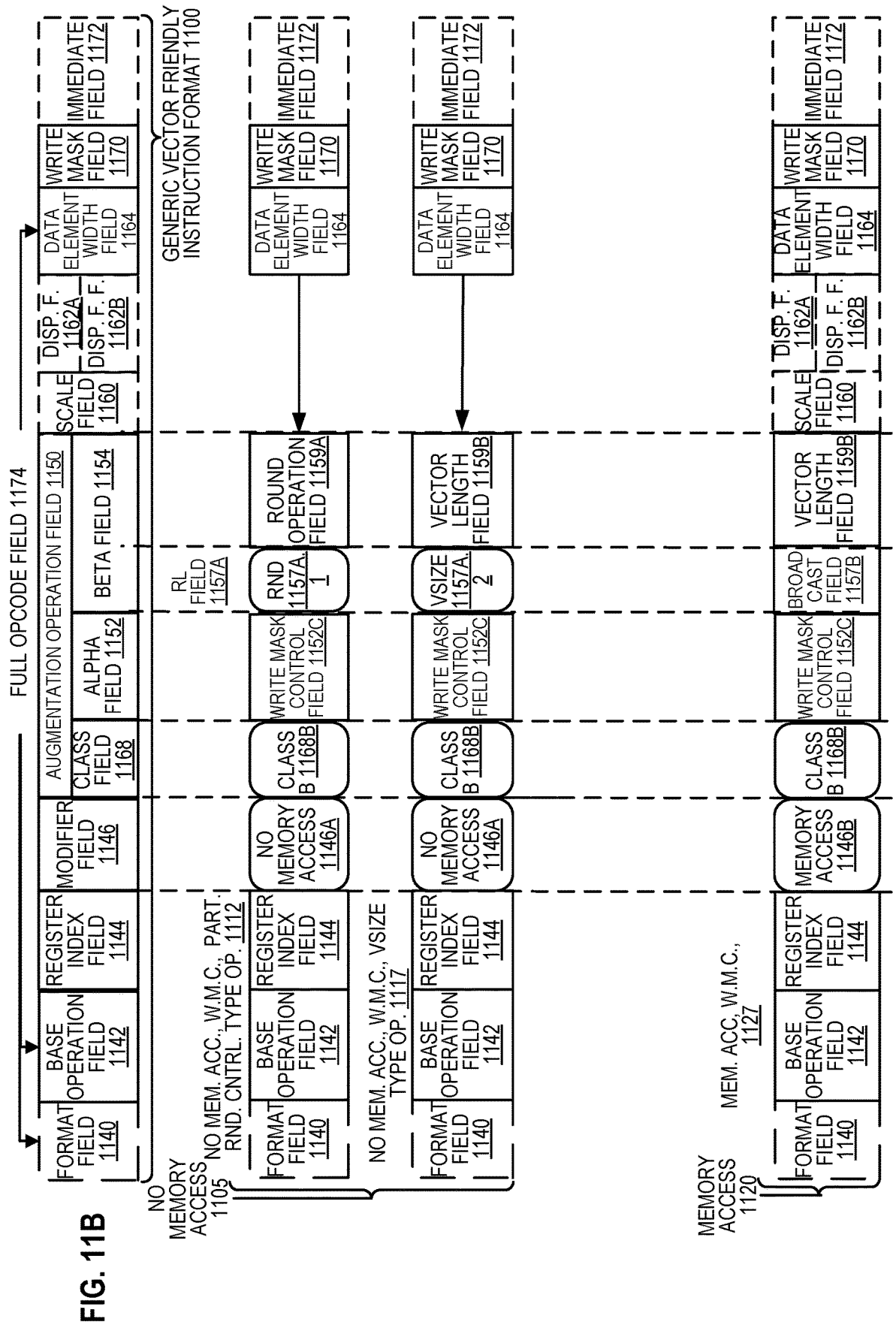
FIG. 11B is a block diagram illustrating the generic vector friendly instruction format and class B instruction templates thereof according to embodiments of the disclosure.

FIGS. 11A-11B are block diagrams illustrating a generic vector friendly instruction format and instruction templates thereof according to embodiments of the disclosure. FIG. 11A is a block diagram illustrating a generic vector friendly instruction format and class A instruction templates thereof according to embodiments of the disclosure; while FIG. 11B is a block diagram illustrating the generic vector friendly instruction format and class B instruction templates thereof according to embodiments of the disclosure. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the disclosure, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*index+base$).

Displacement Field 1162A—its content is used as part of memory address generation (e.g., for address generation that uses $2^{scale}*index+base+displacement$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled$ displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the disclosure are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the disclosure the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the disclosure where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the disclosure where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support a different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the disclosure. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the disclosure are described with reference to the specific vector friendly instruction format 1200 in the context of the generic vector friendly instruction format 1100 for illustrative purposes, the disclosure is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the disclosure is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]-X), and 1157BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the disclosure. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the disclosure. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
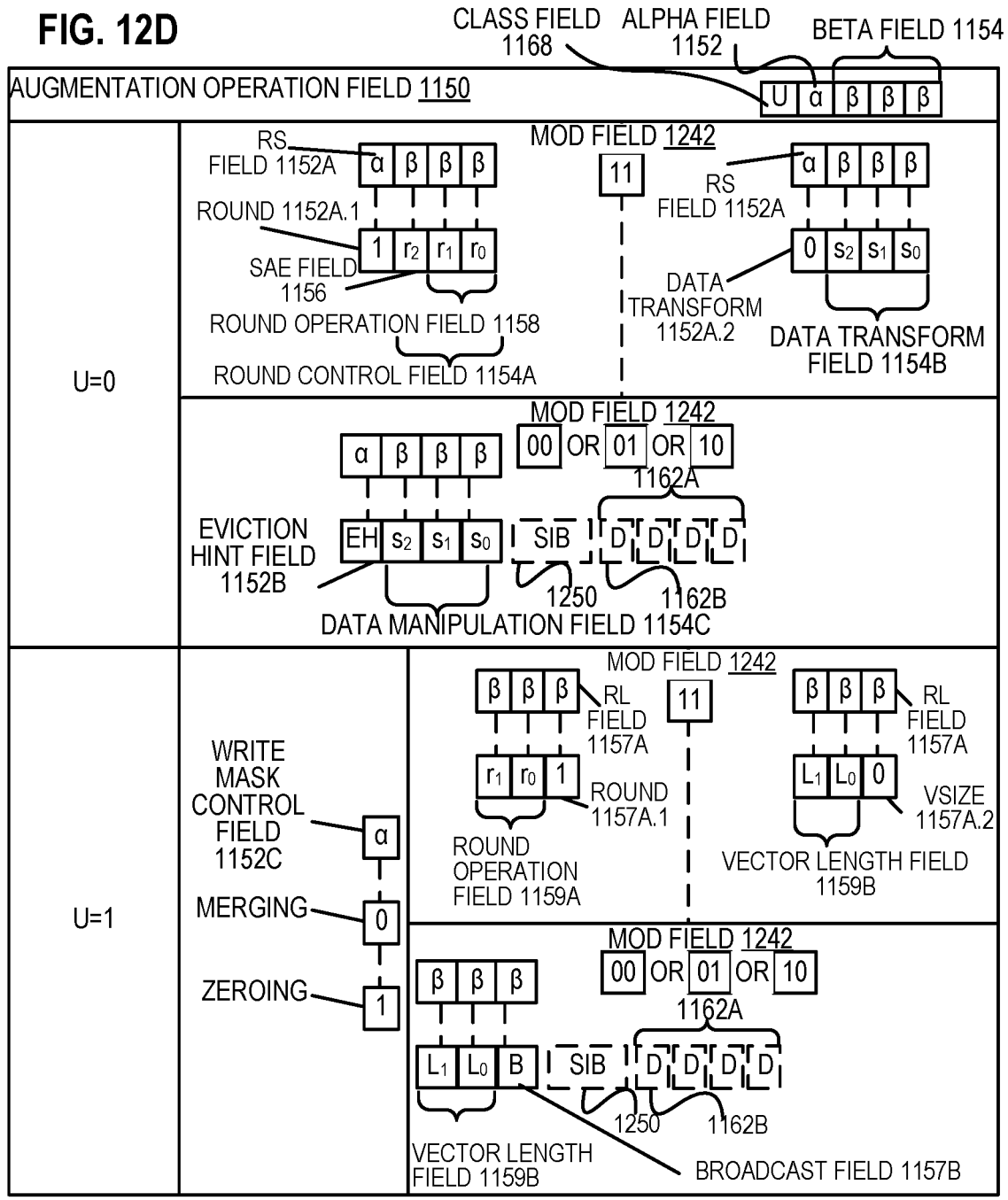
FIG. 12D is a block diagram illustrating the fields of the specific vector friendly instruction format in FIG. 12A that make up the augmentation operation field 1150 according to one embodiment of the disclosure.

FIG. 12D is a block diagram illustrating the fields of the specific vector friendly instruction format 1200 that make up the augmentation operation field 1150 according to one embodiment of the disclosure. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
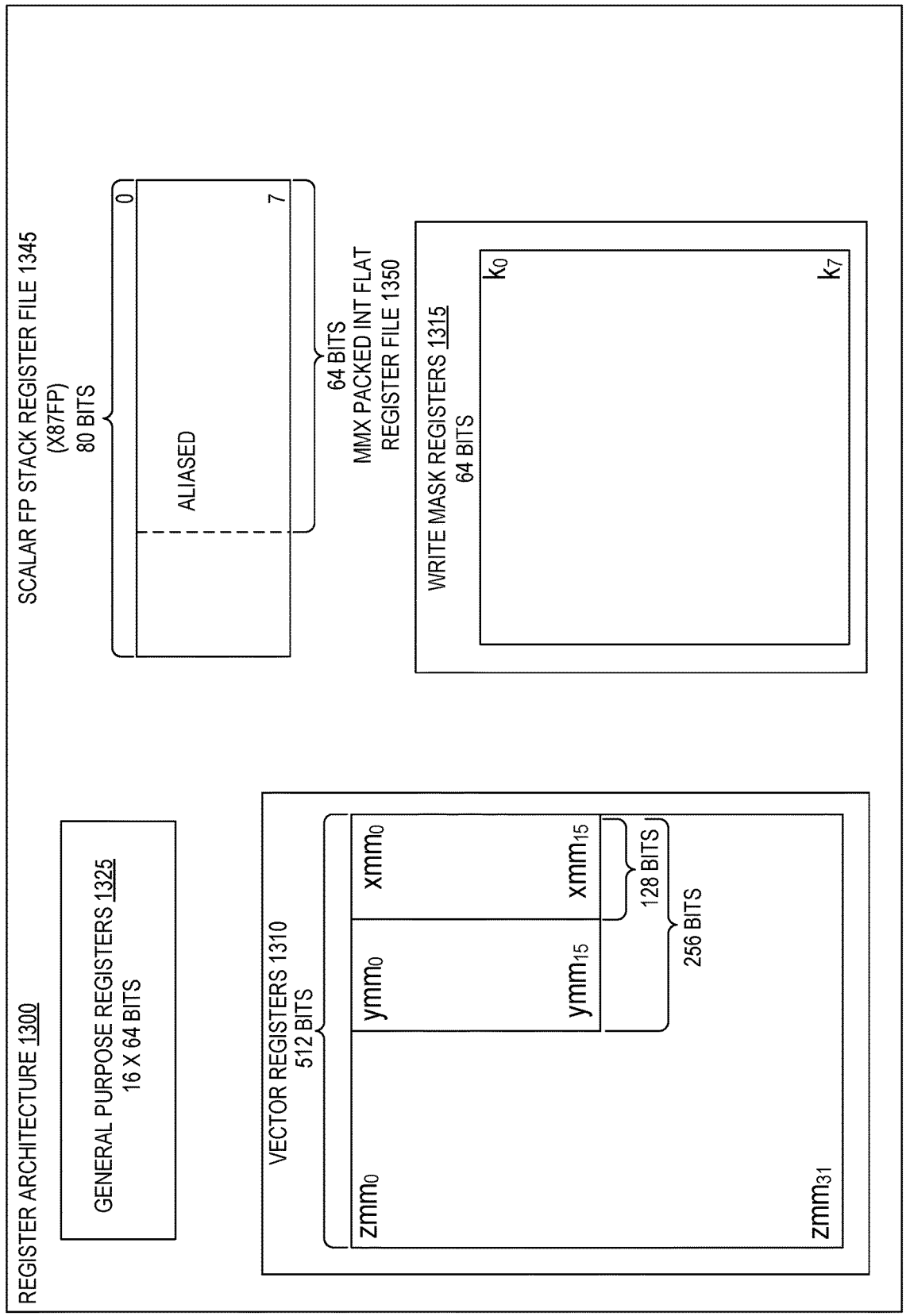
FIG. 13 is a block diagram of a register architecture according to one embodiment of the disclosure

FIG. 13 is a block diagram of a register architecture 1300 according to one embodiment of the disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
| --- | --- | --- | --- |
| Instruction Templates that do not include the vector length field 1159B | A (FIG. 11A; U = 0) | 1110, 1115, 1125, 1130 | zmm registers (the vector length is 64 byte) |
|  | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the disclosure. FIG. 14B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macro-instructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

In certain embodiments, a prefetch circuit 1478 is included to prefetch data, for example, to predict access addresses and bring the data for those addresses into a cache or caches (e.g., from memory 1480).

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
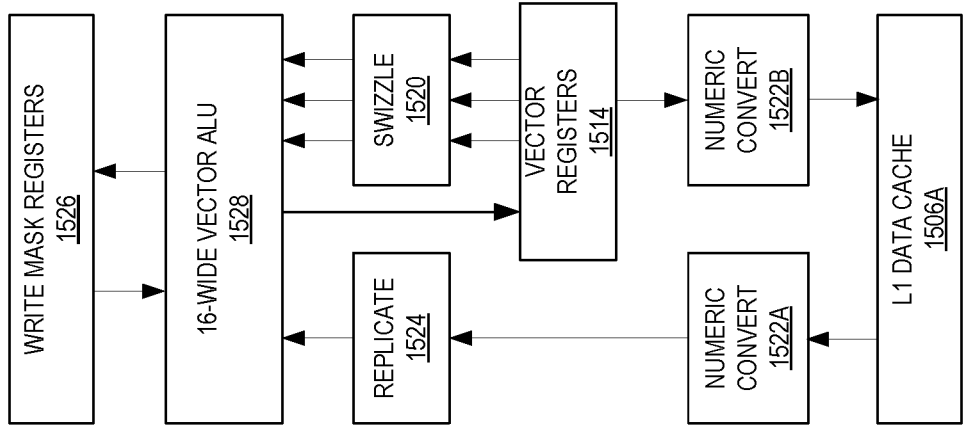
FIG. 15B is an expanded view of part of the processor core in FIG. 15A according to embodiments of the disclosure.
Figure 15A:
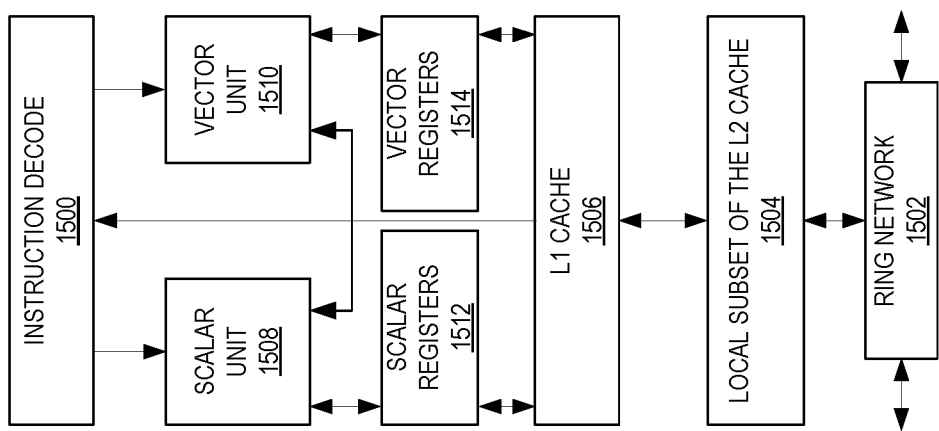
FIG. 15A is a block diagram of a single processor core, along with its connection to the on-die interconnect network and with its local subset of the Level 2 (L2) cache, according to embodiments of the disclosure.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the disclosure. In one embodiment, an instruction decode unit 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the disclosure may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the disclosure. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
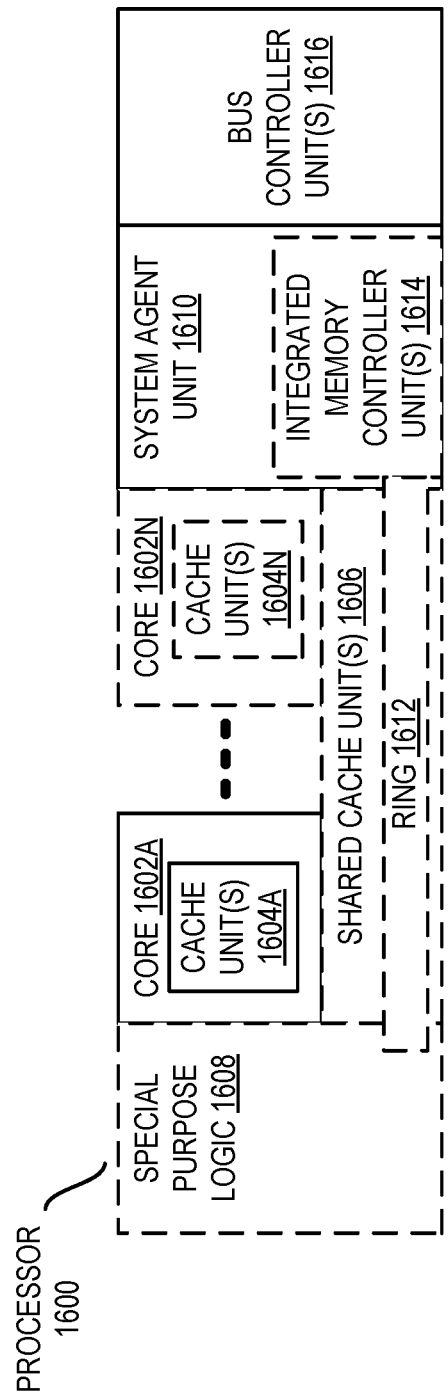
FIG. 16 is a block diagram of a processor that may have more than one core, may have an integrated memory controller, and may have integrated graphics according to embodiments of the disclosure.

FIG. 16 is a block diagram of a processor 1600 that may have more than one core, may have an integrated memory controller, and may have integrated graphics according to embodiments of the disclosure. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multithreading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
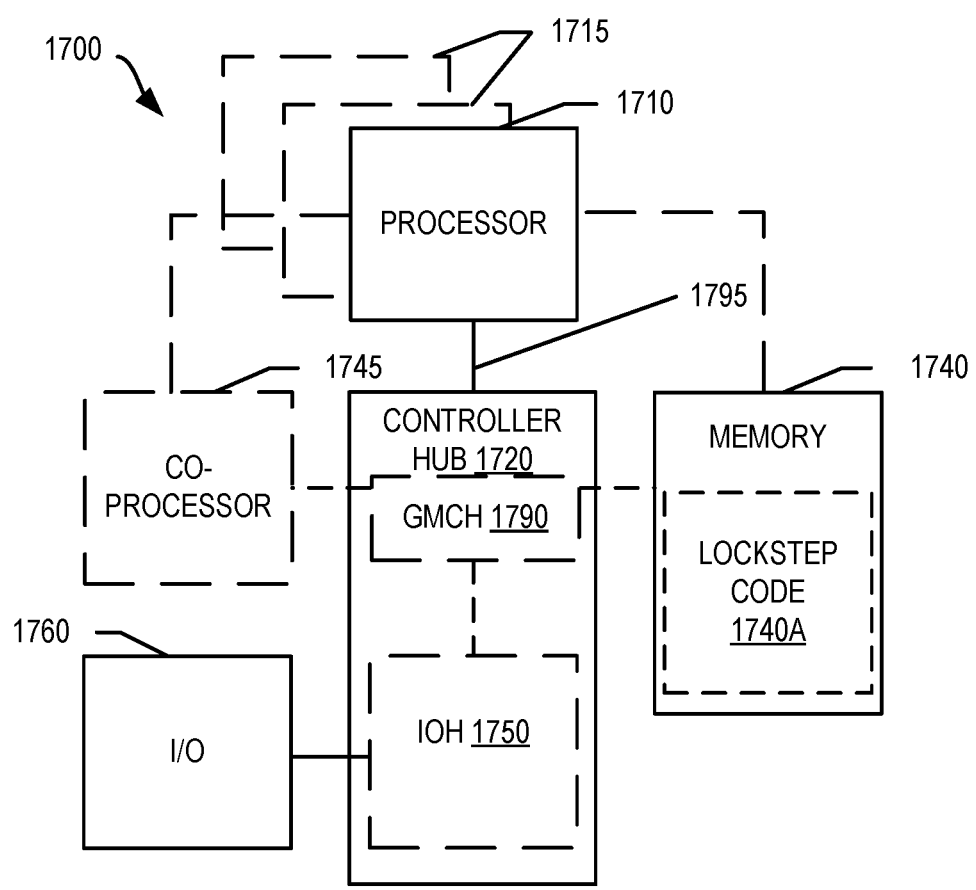
FIG. 17 is a block diagram of a system in accordance with one embodiment of the present disclosure.

Referring now to FIG. 17, shown is a block diagram of a system 1700 in accordance with one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750. Memory 1740 may include lockstep code 1740A, for example, to store code that when executed causes a processor to perform any method of this disclosure.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quickpath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
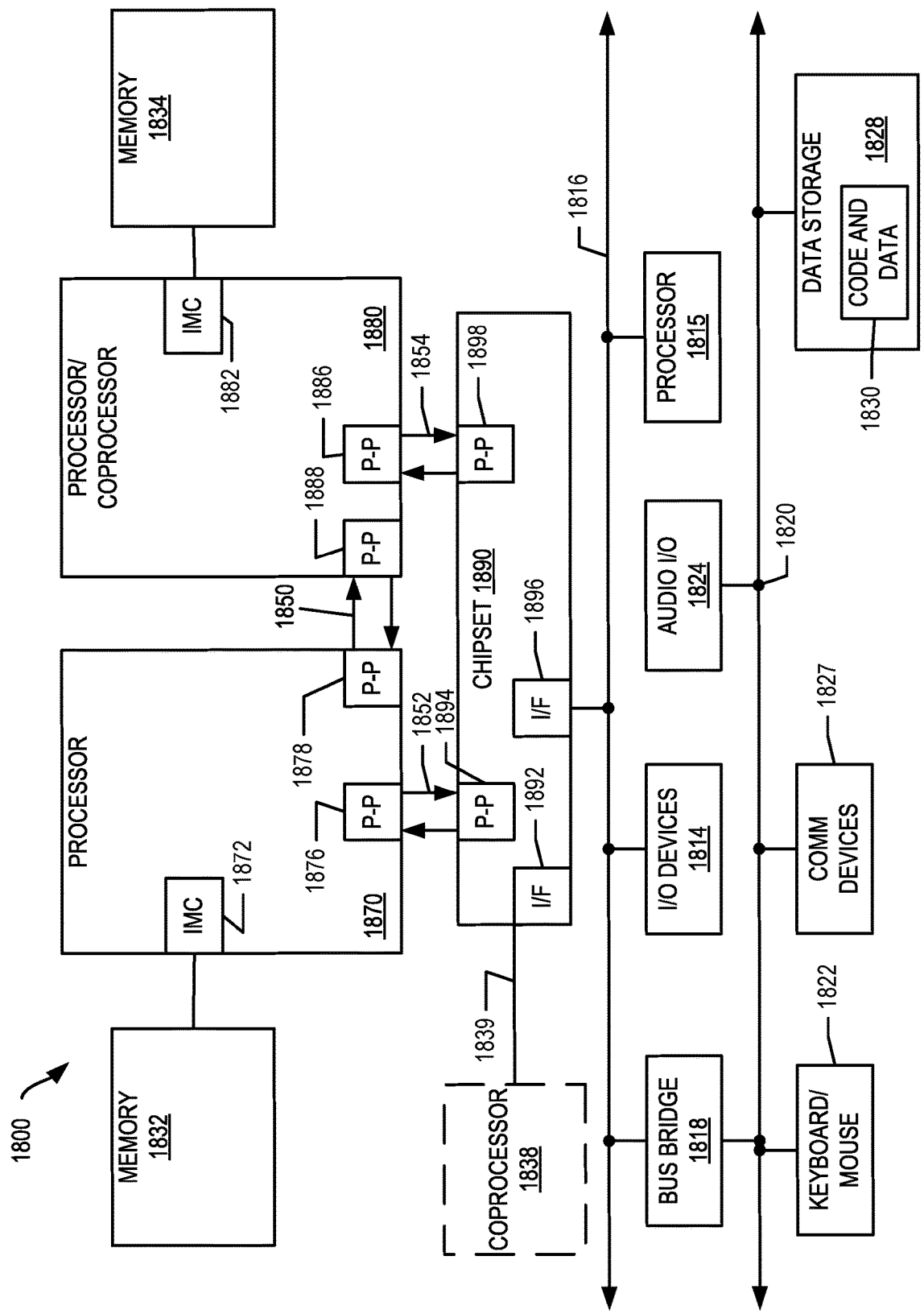
FIG. 18 is a block diagram of a more specific exemplary system in accordance with an embodiment of the present disclosure.

Referring now to FIG. 18, shown is a block diagram of a first more specific exemplary system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the disclosure, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
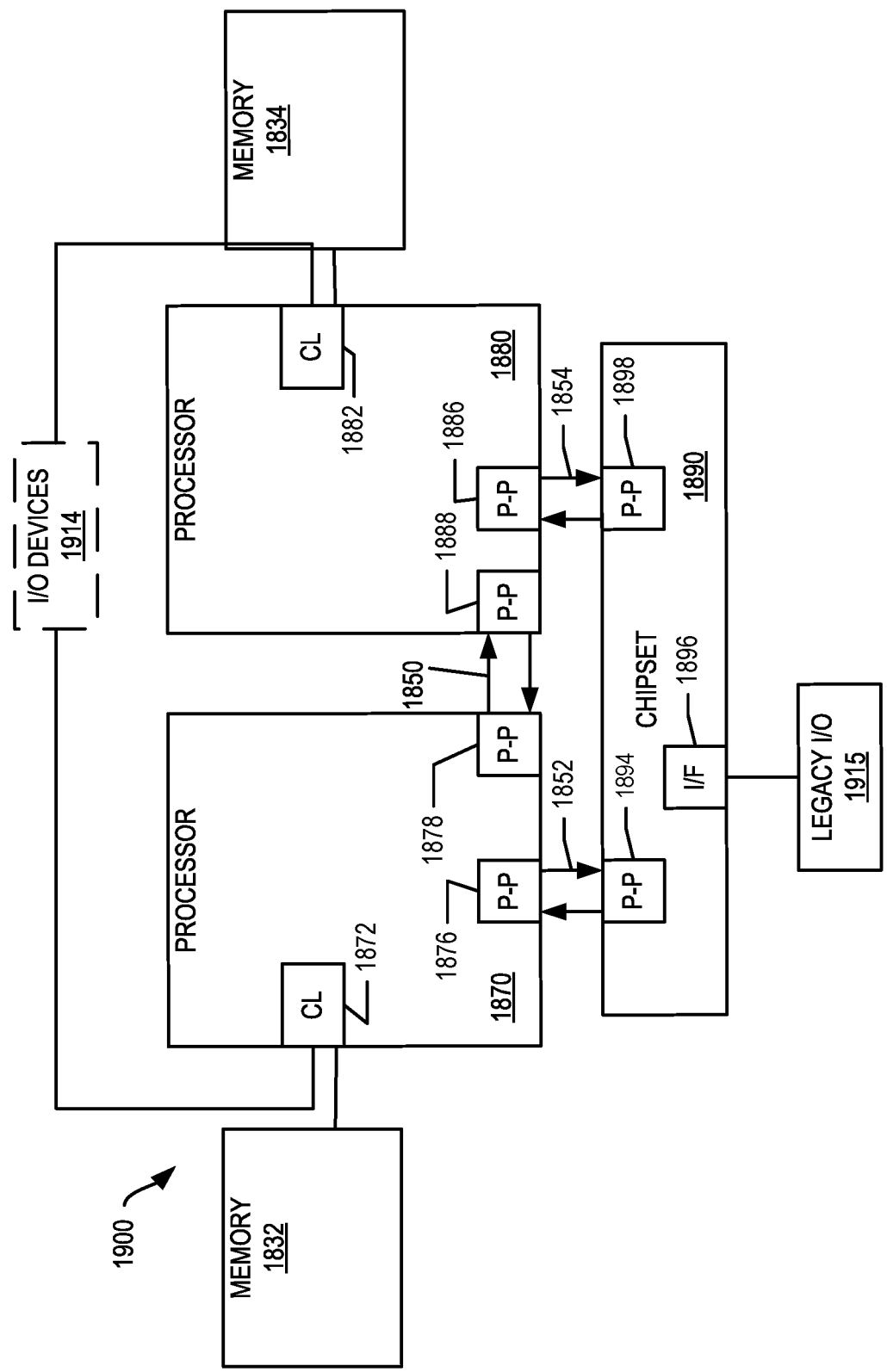
FIG. 19, shown is a block diagram of a second more specific exemplary system in accordance with an embodiment of the present disclosure.

Referring now to FIG. 19, shown is a block diagram of a second more specific exemplary system 1900 in accordance with an embodiment of the present disclosure. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
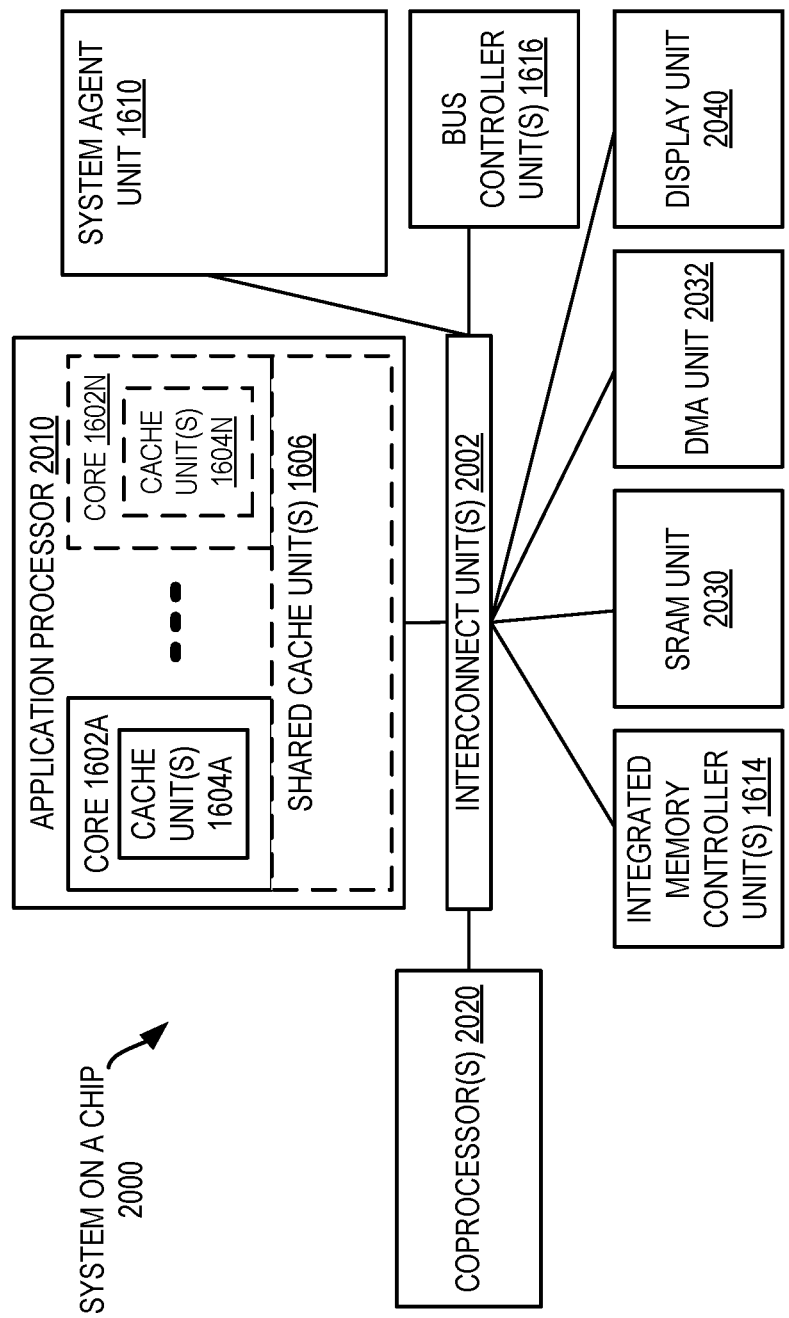
FIG. 20, shown is a block diagram of a system on a chip (SoC) in accordance with an embodiment of the present disclosure.

Referring now to FIG. 20, shown is a block diagram of a SoC 2000 in accordance with an embodiment of the present disclosure. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 202A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
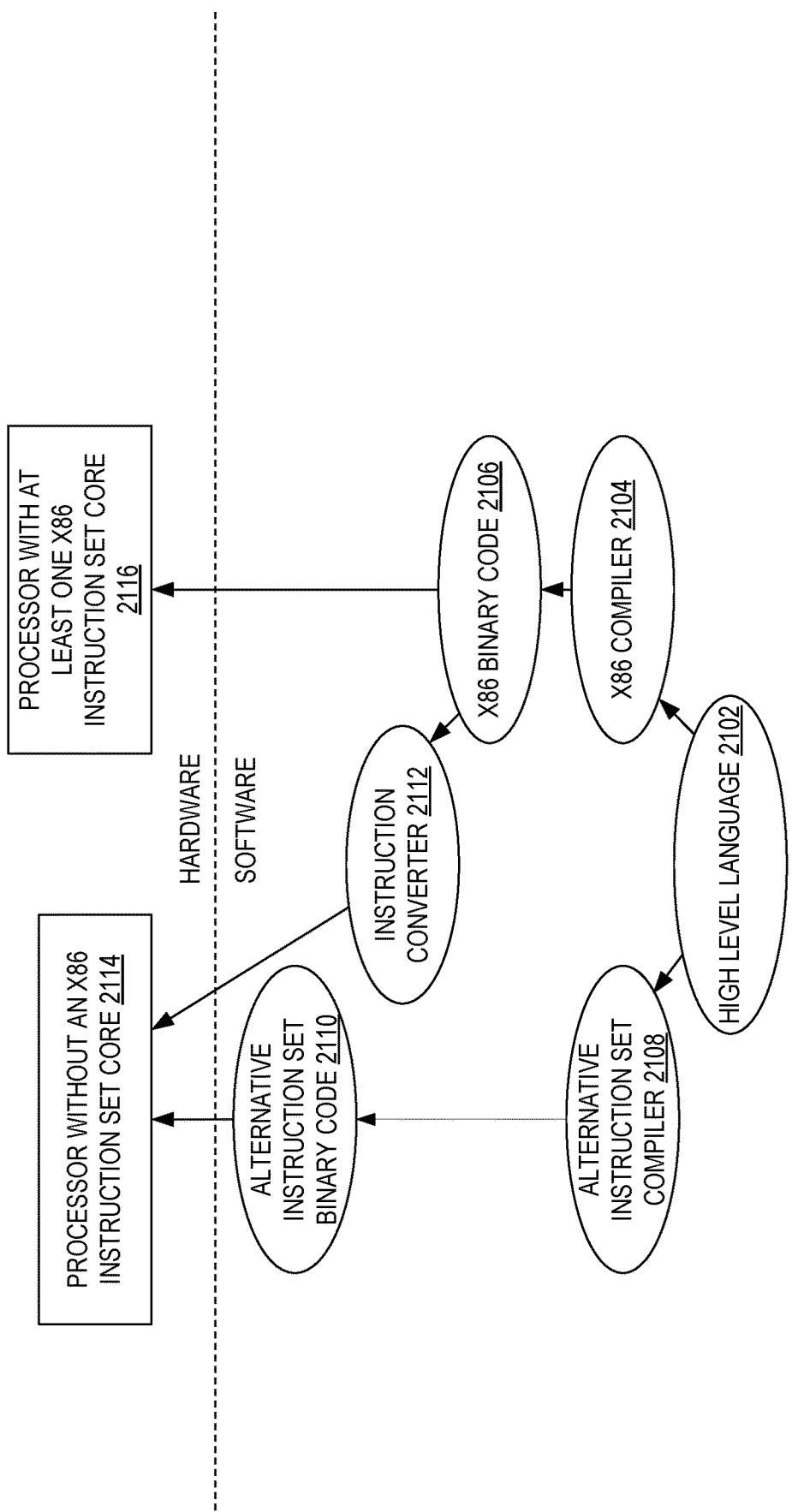
FIG. 21 is a block diagram contrasting the use of a software instruction converter to convert binary instructions in a source instruction set to binary instructions in a target instruction set according to embodiments of the disclosure.

FIG. 21 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

What is claimed is:

1. A hardware processor comprising:
a first processor core comprising a first control flow signature register and a first execution circuit;
a second processor core comprising a second control flow signature register and a second execution circuit; and
at least one signature circuit to:
perform a first state history compression operation on a first instruction that executes on the first execution circuit of the first processor core to produce a first result,
store the first result in the first control flow signature register,
perform a second state history compression operation on a second instruction that executes on the second execution circuit of the second processor core to produce a second result, and
store the second result in the second control flow signature register.

2. The hardware processor of claim 1, wherein the at least one signature circuit is to:
perform a third state history compression operation on a third instruction that executes on the first execution circuit of the first processor core to produce a third result,
perform a fourth state history compression operation on the first result and the third result to produce a fourth result,
store the fourth result in the first control flow signature register,
perform a fifth state history compression operation on a fourth instruction that executes on the second execution circuit of the second processor core to produce a fifth result,
perform a sixth state history compression operation on the second result and the fifth result to produce a sixth result, and
store the sixth result in the second control flow signature register.

3. The hardware processor of claim 1, wherein the first state history compression operation is performed on an opcode and an operand of the first instruction.

4. The hardware processor of claim 1, further comprising decoding an instruction with a decoder of the first processor core into a decoded instruction and executing the decoded instruction with the first execution circuit of the first processor core to compare the first result in the first control flow signature register and the second result in the second control flow signature register, and trigger an error indication when the first result differs from the second result.

5. The hardware processor of claim 1, wherein the first processor core comprises a first data flow signature register, the second processor core comprises a second data flow signature register, and the at least one signature circuit is to:
perform a third state history compression operation on a resultant of the first instruction that executes on the first execution circuit of the first processor core to produce a third result,
store the third result in the first data flow signature register,
perform a fourth state history compression operation on a resultant of the second instruction that executes on the second execution circuit of the second processor core to produce a fourth result, and
store the fourth result in the second data flow signature register.

6. The hardware processor of claim 5, further comprising decoding an instruction with a decoder of the first processor core into a decoded instruction and executing the decoded instruction with the first execution circuit of the first processor core to compare the first result in the first control flow signature register and the second result in the second control flow signature register, compare the third result in the first data flow signature register and the fourth result in the second data flow signature register, and trigger an error indication when the first result differs from the second result or when the third result differs from the fourth result.

7. The hardware processor of claim 5, wherein the at least one signature circuit is to:
perform a fifth state history compression operation on a resultant of a third instruction that executes on the first execution circuit of the first processor core to produce a fifth result,
perform a sixth state history compression operation on the third result and the fifth result to produce a sixth result,
store the sixth result in the first data flow signature register,
perform a seventh state history compression operation on a resultant of a fourth instruction that executes on the second execution circuit of the second processor core to produce a seventh result,
perform an eighth state history compression operation on the fourth result and the seventh result to produce an eighth result, and
store the eighth result in the second data flow signature register.

8. The hardware processor of claim 1, wherein the first state history compression operation on the first instruction comprises a first cyclic redundancy check on an instruction pointer of the first instruction and a second cyclic redundancy check on at least one field of the first instruction to produce the first result.

9. A method comprising:
executing a first instruction with a first execution circuit of a first processor core of a processor;
performing a first state history compression operation on the first instruction that executes on the first execution circuit of the first processor core to produce a first result;
storing the first result in a first control flow signature register of the first processor core;

executing a second instruction with a second execution circuit of a second processor core of the processor;

performing a second state history compression operation on the second instruction that executes on the second execution circuit of the second processor core to produce a second result; and storing the second result in a second control flow signature register of the second processor core.

10. The method of claim 9, further comprising:

performing a third state history compression operation on a third instruction that executes on the first execution circuit of the first processor core to produce a third result;

performing a fourth state history compression operation on the first result and the third result to produce a fourth result;

storing the fourth result in the first control flow signature register;

performing a fifth state history compression operation on a fourth instruction that executes on the second execution circuit of the second processor core to produce a fifth result;

performing a sixth state history compression operation on the second result and the fifth result to produce a sixth result; and storing the sixth result in the second control flow signature register.

11. The method of claim 9, wherein the first state history compression operation is performed on an opcode and an operand of the first instruction.

12. The method of claim 9, further comprising:

decoding an instruction with a decoder of the first processor core into a decoded instruction; and executing the decoded instruction with the first execution circuit of the first processor core to compare the first result in the first control flow signature register and the second result in the second control flow signature register, and trigger an error indication when the first result differs from the second result.

13. The method of claim 9, further comprising:

performing a third state history compression operation on a resultant of the first instruction that executes on the first execution circuit of the first processor core to produce a third result, storing the third result in a first data flow signature register of the first processor core;

performing a fourth state history compression operation on a resultant of the second instruction that executes on the second execution circuit of the second processor core to produce a fourth result; and storing the fourth result in a second data flow signature register of the second processor core.

14. The method of claim 13, further comprising:

decoding an instruction with a decoder of the first processor core into a decoded instruction; and executing the decoded instruction with the first execution circuit of the first processor core to compare the first result in the first control flow signature register and the second result in the second control flow signature register, compare the third result in the first data flow signature register and the fourth result in the second data flow signature register, and trigger an error indication when the first result differs from the second result or when the third result differs from the fourth result.

15. The method of claim 13, further comprising:

performing a fifth state history compression operation on a resultant of a third instruction that executes on the first execution circuit of the first processor core to produce a fifth result;

performing a sixth state history compression operation on the third result and the fifth result to produce a sixth result;

storing the sixth result in the first data flow signature register;

performing a seventh state history compression operation on a resultant of a fourth instruction that executes on the second execution circuit of the second processor core to produce a seventh result;

performing an eighth state history compression operation on the fourth result and the seventh result to produce an eighth result; and storing the eighth result in the second data flow signature register.

16. The method of claim 9, wherein the performing the first state history compression operation on the first instruction comprises performing a first cyclic redundancy check on an instruction pointer of the first instruction and a second cyclic redundancy check on at least one field of the first instruction to produce the first result.

17. A non-transitory machine readable medium that stores program code that when executed by a machine causes the machine to perform a method comprising:

executing a first instruction with a first execution circuit of a first processor core of a processor;

performing a first state history compression operation on the first instruction that executes on the first execution circuit of the first processor core to produce a first result;

storing the first result in a first control flow signature register of the first processor core;

executing a second instruction with a second execution circuit of a second processor core of the processor;

performing a second state history compression operation on the second instruction that executes on the second execution circuit of the second processor core to produce a second result; and storing the second result in a second control flow signature register of the second processor core.

18. The non-transitory machine readable medium of claim 17, wherein the method further comprises:

performing a third state history compression operation on a third instruction that executes on the first execution circuit of the first processor core to produce a third result;

performing a fourth state history compression operation on the first result and the third result to produce a fourth result;

storing the fourth result in the first control flow signature register;

performing a fifth state history compression operation on a fourth instruction that executes on the second execution circuit of the second processor core to produce a fifth result;

performing a sixth state history compression operation on the second result and the fifth result to produce a sixth result; and storing the sixth result in the second control flow signature register.

19. The non-transitory machine readable medium of claim 17, wherein the first state history compression operation is performed on an opcode and an operand of the first instruction.

20. The non-transitory machine readable medium of claim 17, wherein the method further comprises:
  decoding an instruction with a decoder of the first processor core into a decoded instruction; and
  executing the decoded instruction with the first execution circuit of the first processor core to compare the first result in the first control flow signature register and the second result in the second control flow signature register, and trigger an error indication when the first result differs from the second result.

21. The non-transitory machine readable medium of claim 17, wherein the method further comprises:
  performing a third state history compression operation on a resultant of the first instruction that executes on the first execution circuit of the first processor core to produce a third result,
  storing the third result in a first data flow signature register of the first processor core;
  performing a fourth state history compression operation on a resultant of the second instruction that executes on the second execution circuit of the second processor core to produce a fourth result; and
  storing the fourth result in a second data flow signature register of the second processor core.

22. The non-transitory machine readable medium of claim 21, wherein the method further comprises:
  decoding an instruction with a decoder of the first processor core into a decoded instruction; and
  executing the decoded instruction with the first execution circuit of the first processor core to compare the first result in the first control flow signature register and the second result in the second control flow signature register, compare the third result in the first data flow signature register and the fourth result in the second data flow signature register, and trigger an error indication when the first result differs from the second result or when the third result differs from the fourth result.

23. The non-transitory machine readable medium of claim 21, wherein the method further comprises:
  performing a fifth state history compression operation on a resultant of a third instruction that executes on the first execution circuit of the first processor core to produce a fifth result;
  performing a sixth state history compression operation on the third result and the fifth result to produce a sixth result;
  storing the sixth result in the first data flow signature register;
  performing a seventh state history compression operation on a resultant of a fourth instruction that executes on the second execution circuit of the second processor core to produce a seventh result;
  performing an eighth state history compression operation on the fourth result and the seventh result to produce an eighth result; and
  storing the eighth result in the second data flow signature register.

24. The non-transitory machine readable medium of claim 17, wherein the performing the first state history compression operation on the first instruction comprises performing a first cyclic redundancy check on an instruction pointer of the first instruction and a second cyclic redundancy check on at least one field of the first instruction to produce the first result.

* * * * *